(12) United States Patent
Hattori et al.

(10) Patent No.: US 7,499,080 B2
(45) Date of Patent: Mar. 3, 2009

(54) IMAGE SENSOR WITH ADJUSTABLE READOUT AREA

(75) Inventors: Yuichiro Hattori, Yokohama (JP); Hisataka Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 10/922,725

(22) Filed: Aug. 20, 2004

(65) Prior Publication Data

US 2005/0012826 A1   Jan. 20, 2005

Related U.S. Application Data

(63) Continuation of application No. 09/293,239, filed on Apr. 16, 1999, now Pat. No. 6,937,277.

(30) Foreign Application Priority Data

| Apr. 24, 1998 | (JP) | ................................. 10-114736 |
| Jun. 29, 1998 | (JP) | ................................. 10-183030 |

(51) Int. Cl.
    *H04N 5/225* (2006.01)
(52) U.S. Cl. .................................. 348/220.1
(58) Field of Classification Search ............... 348/220.1
    See application file for complete search history.

(56) References Cited

U.S. PATENT DOCUMENTS

| 4,760,455 A   | 7/1988  | Nagashima |
| 4,858,020 A * | 8/1989  | Homma ....................... 358/451 |
| 4,951,149 A   | 8/1990  | Faroudja |
| 5,034,811 A * | 7/1991  | Palm .......................... 348/154 |
| 5,471,251 A   | 11/1995 | Inaba et al. |
| 5,491,512 A * | 2/1996  | Itakura et al. ................ 348/321 |
| 6,151,069 A * | 11/2000 | Dunton et al. ............ 348/220.1 |
| 6,232,945 B1  | 5/2001  | Moriyama et al. |
| 6,236,388 B1* | 5/2001  | Iida et al. ..................... 345/698 |
| 2001/0010558 A1* | 8/2001 | Yasuda ........................ 348/350 |
| 2001/0045990 A1* | 11/2001 | Yamada ....................... 348/354 |

FOREIGN PATENT DOCUMENTS

| JP | A 4-157987 | 5/1992 |
| JP | A 5-3555   | 1/1993 |
| JP | A 5-130488 | 5/1993 |

(Continued)

OTHER PUBLICATIONS

Patent Abstract of Japan corresponding to JPA 8-037634, Jun. 2, 1996.

(Continued)

*Primary Examiner*—James M Hannett
(74) *Attorney, Agent, or Firm*—Morgan&Finnegan, LLP

(57) ABSTRACT

This invention relates to a video camera for inputting an image of an object as an electrical signal. This video camera includes a CCD, a clock selector for selecting a clock having a frequency corresponding to a read object region in which pixels are read out from the CCD, a CCD controller for driving the CCD in accordance with the clock having the selected frequency to read out pixels from the read object region, and a monitor for displaying an image on the basis of the pixels read out from the CCD.

4 Claims, 17 Drawing Sheets

FOREIGN PATENT DOCUMENTS

| | | |
|---|---|---|
| JP | A 6-225334 | 8/1994 |
| JP | A 7-135592 | 5/1995 |
| JP | A 8-037634 | 2/1996 |
| JP | A 9-046583 | 2/1997 |
| JP | A 10-13747 | 1/1998 |
| JP | A 10-304250 | 11/1998 |
| JP | A 11-355665 | 12/1999 |

OTHER PUBLICATIONS

Patent Abstract of Japan corresponding to JPA 11-355665, Dec. 24, 1999.

Patent Abstract of Japan corresponding to JPA 9-046583, Feb. 14, 1997.

Patent Abstract of Japan corresponding to JPA 7-135592, May 23, 1995.

Patent Abstract of Japan corresponding to JPA 6-225334, Aug. 12, 1994.

Japanese Office Action dated Oct. 7, 2002.

English translation of Japanese Application No. 10-13747, Jan. 16, 1998.

* cited by examiner

HORIZONTAL SCANNING DIRECTION

VERTICAL SCANNING DIRECTION

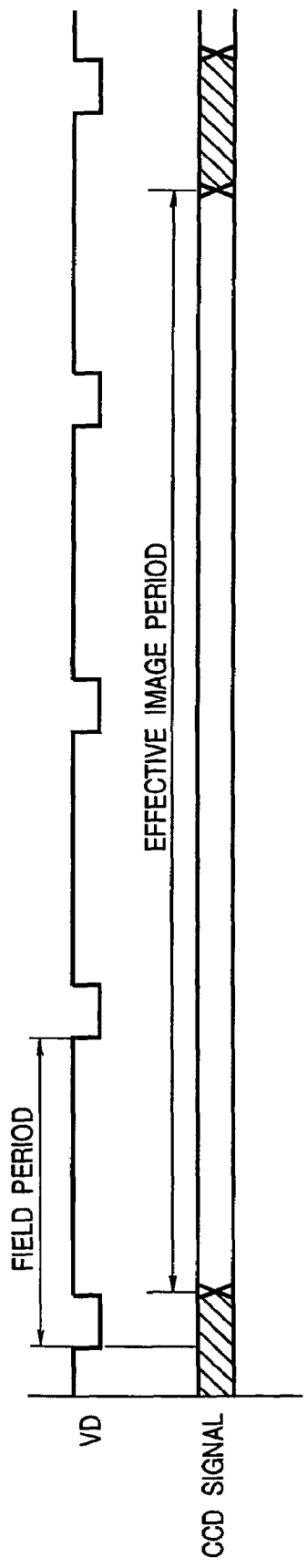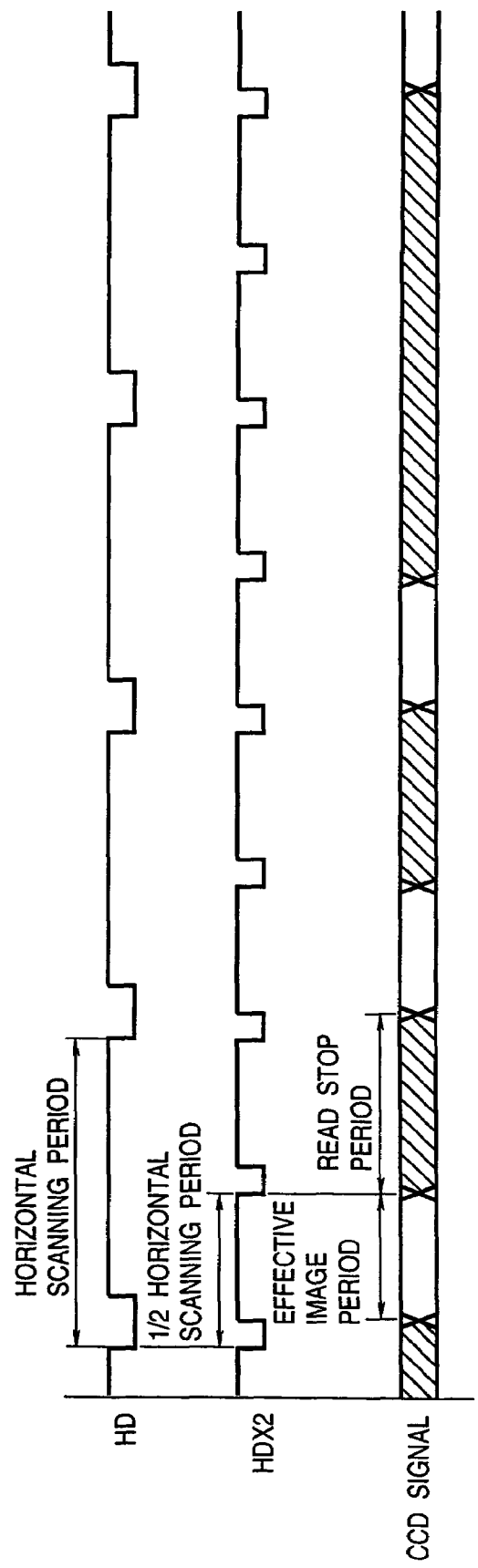

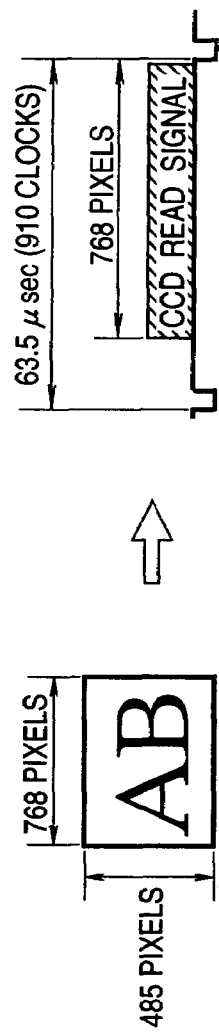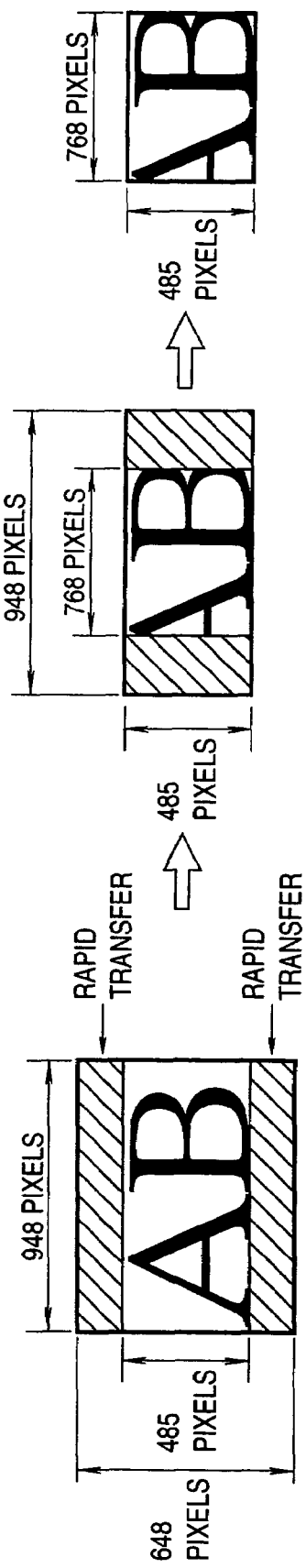

IMAGE SENSOR WITH ADJUSTABLE READOUT AREA

This is continuation of application Ser. No. 09/293,239, filed Apr. 16, 1999 now U.S. Pat. No. 6,937,277.

BACKGROUND OF THE INVENTION

1. Field of the Invention

The present invention relates to an image input apparatus, image input method, and memory medium and, more particularly, to an image input apparatus and image input method of inputting an image of an object as an electrical signal by using an image sensing device, and a memory medium used to control the apparatus.

2. Description of the Related Art

With the recent progress of digital signal processing technologies and semiconductor technologies, a consumer digital video standard by which motion image signals of a standard television system, e.g., the NTSC or the PAL system, are digital-recorded is proposed. Also, as one application of this standard, video cameras integrating a digital video recording/reproduction apparatus and a digital camera have been commercialized.

By making the best use of characteristic features of digital recording, some video cameras of this type include a still image recording function or comprise a digital I/F for connecting a computer or the like to transfer a photographed image to the computer or the like.

To reproduce a photographed image on the screen of a television monitor, a video camera need only include an image sensing device having pixels the number of which is equivalent to the number of pixels (e.g., 720×480 pixels) defined by the digital video standard. However, to supply an image from a video camera to another apparatus via a digital I/F or recording medium (e.g., a video tape), it is desirable to supply an image having the number of pixels meeting the specifications of the apparatus.

One prior art relevant to the present invention is a video camera including an image sensing device having pixels the number of which is larger than the number of finally necessary pixels. One example is a video camera which compensates for camera shake by reading out some pixels of an image sensing device.

FIG. 18 is a block diagram showing the arrangement of a video camera including a camera shake compensating function. This video camera comprises a CCD 2002, a CCD controller 2004, a clock generator 2006, a control signal generator 2010, an A/D converter 2014, a camera signal generator 2016, a memory 2042, a memory controller 2046, an interpolating unit 2044, and a D/A converter 2040. The CCD controller 2004 controls signal read from the CCD 2002. The clock generator 2006 generates a system clock. The control signal generator 2010 generates various control signals in accordance with the output system clock from the clock generator 2006. The A/D converter 2014 converts an output analog signal from the CCD 2002 into a digital signal. The camera signal generator 2016 generates a video signal from the output signal from the A/D converter 2014. The memory 2042 is used to extract a video signal of a predetermined region from the output video signal of a whole region from the camera signal generator 2016 and enlarge the extracted signal. The memory controller 2046 controls the memory 2042. The interpolating unit 2044 interpolates the output video signal from the memory 2042. The D/A converter 2040 converts the output digital video signal from the interpolating unit 2044 into an analog video signal.

FIG. 19A is a schematic view showing processing in a video camera including a CCD having pixels the number of which is equivalent to the number of finally required pixels. FIG. 19B is a schematic view showing processing in the video camera shown in FIG. 18.

In the video camera shown in FIG. 19A, the CCD has 768 pixels in the horizontal direction and 485 pixels in the vertical direction. This CCD reads out whole information within one field period in synchronism with a 14.3-MHz (910/63.5 µsec) clock.

In the video camera shown in FIG. 19B, the CCD 2002 has 948 pixels in the horizontal direction and 648 pixels in the vertical direction. Signals corresponding to the hatched portions are discarded. For example, a signal corresponding to the upper hatched portion is read out from the CCD 2002 within a short time period by rapid transfer and discarded. A signal of 485 lines is then read out from the CCD 2002 in synchronism with a 18.0-MHz clock. Subsequently, a signal corresponding to the lower hatched portion is read out from the CCD 2002 within a short time period by rapid transfer and discarded.

By executing the above processing in the horizontal and vertical directions, it is possible to obtain an image formed by cutting a predetermined region (in this example, 768 pixels (horizontal)×485 pixels (vertical)) from an image constructed by all pixels of the CCD 2002. Camera shake compensation is realized by changing the cutting position of an image in accordance with camera shake.

Another prior art relevant to the present invention is a digital camera which displays an image sensed by a CCD by decreasing the number of pixels. FIG. 20 is a block diagram showing the arrangement of a digital camera including a CCD having pixels the number of which is larger than the number of pixels of an image to be displayed on a monitor. The same reference numerals as in the video camera shown in FIG. 18 denote essentially the same components in FIG. 20.

In this digital camera, an image signal of all pixels is read out from a CCD 2002 and supplied to a camera signal generator 2016 via an A/D converter 2014. A first memory 2050 records an output video signal from the camera signal generator 2016. A reducing unit 2052 reduces the video signal of a whole region recorded in the first memory 2050 and records the reduced signal in a second memory 2054. This video signal recorded in the second memory 2054 is read out at a common field frequency and output to a D/A converter 2040 so as to be supplied to a monitor functioning as an electronic finder.

SUMMARY OF THE INVENTION

It is an object of the present invention to select the frequency of a reference clock for driving an image sensing device in accordance with the size of a read object region in which pixels are read out from the image sensing device, thereby reducing the consumption power or the like.

An image input apparatus according to the first aspect of the present invention is an image input apparatus for inputting an image of an object as an electrical signal, comprising an image sensing device, selecting means for selecting a frequency corresponding to a size of a read object region in which pixels are read out from the image sensing device, driving means for driving the image sensing device in accordance with a clock having the selected frequency to read out pixels from the read object region, and output means for outputting an image on the basis of the pixels read out from the image sensing device.

In the image input apparatus according to the first aspect of the present invention, the driving means preferably drives the image sensing device in accordance with a clock having a relatively high frequency when the read object region is large, and drives the image sensing device in accordance with a clock having a relatively low frequency when the read object region is small.

In the image input apparatus according to the first aspect of the present invention, the driving means preferably drives the image sensing device in accordance with a clock having a relatively low frequency when the read object region is a part of a whole pixel region of the image sensing device, and drives the image sensing device in accordance with a clock having a relatively high frequency when the read object region is the whole pixel region of the image sensing device.

In the image input apparatus according to the first aspect of the present invention, the driving means preferably comprises first clock generating means for generating a clock having a first frequency, and second clock generating means for generating a clock having a second frequency different from the first frequency.

In the image input apparatus according to the first aspect of the present invention, the output means preferably comprises display means for displaying an image on the basis of the pixels read out from the image sensing device.

In the image input apparatus according to the first aspect of the present invention, the driving means preferably drives the image sensing device in accordance with horizontal and vertical sync signals based on the clock, thereby reading out a signal for constructing a motion image from the image sensing device, and the display means preferably displays the motion image on the basis of the signal read out from the image sensing device.

In the image input apparatus according to the first aspect of the present invention, the control means preferably drives the image sensing device in accordance with horizontal and vertical sync signals based on a clock having a frequency determined in accordance with the size of the read object region so as to match horizontal and vertical scanning periods of the display means.

In the image input apparatus according to the first aspect of the present invention, the control means preferably drives the image sensing device in accordance with horizontal and vertical sync signals based on the clock, thereby reading out a signal for constructing a motion image from the image sensing device.

In the image input apparatus according to the first aspect of the present invention, the output means preferably comprises converting means for converting an image constructed by a signal readout from the image sensing device into an image of a predetermined size, thereby generating an image to be output.

It is another object of the present invention to obtain an image having the number of pixels corresponding to the specifications of an apparatus for reproducing the image.

An image input apparatus according to the second aspect of the present invention is an image input apparatus for inputting an image of an object as an electrical signal, comprising an image sensing device, selecting means for selecting an operation mode, image processing means for determining a read object region having a size corresponding to the operation mode selected by the selecting means, the read object region being a region in which pixels are read out from the image sensing device, reading out pixels from the determined read object region, and generating an image having pixels the number of which corresponds to the operation mode selected by the selecting means by using the readout pixels, and output means for outputting the image generated by the image processing means.

In the image input apparatus according to the second aspect of the present invention, the output means preferably comprises recording means for recording the image generated by the image processing means into a recording medium.

In the image input apparatus according to the second aspect of the present invention, the operation mode preferably includes first and second modes, and the image processing means preferably reads out pixels from a read region corresponding to the first mode and generates an image having pixels the number of which is defined by a predetermined recording format by using the readout pixels in the first mode, and reads out pixels from a read region corresponding to the second mode and generates an image having pixels the number of which is larger than the number of pixels of the image generated in the first mode by using the readout pixels in the second mode.

In the image input apparatus according to the second aspect of the present invention, the output means preferably comprises segmenting means for segmenting the image generated by the image processing means such that the image matches the predetermined recording format.

In the image input apparatus according to the second aspect of the present invention, the image sensing device preferably has pixels the number of which is larger than the number of pixels corresponding to the predetermined recording format, the read region corresponding to the first format is preferably a region having pixels the number of which corresponds to the predetermined recording format, and the read region corresponding to the second mode is preferably a region for obtaining pixels the number of which is larger than the number of pixels corresponding to the predetermined recording format.

In the image input apparatus according to the second aspect of the present invention, in the second mode the image processing means preferably reads out pixels from the read region corresponding to the second mode in a vertical scanning period n (natural number)×m (natural number) times a vertical scanning period in the first mode, and converts an image constructed by the readout pixels into an image in which the numbers of pixels are n and m times as large, in horizontal and vertical directions, respectively, as those of an image generated in the first mode.

In the image input apparatus according to the second aspect of the present invention, in the second mode the image processing means preferably reads out all pixels of the image sensing device by setting a whole region of the image sensing device as the read object region.

In the image input apparatus according to the second aspect of the present invention, the image processing means preferably comprises means which, in the second mode, reads out pixels from the read object region corresponding to the second mode in a vertical scanning period n (natural number)×m (natural number) times a vertical scanning period in the first mode, and converts an image constructed by the readout pixels into an image in which the numbers of pixels are (n−1) to n and (m−1) to m times as large, in horizontal and vertical directions, respectively, as those of an image generated in the first mode.

In the image input apparatus according to the second aspect of the present invention, in the second mode the image processing means preferably reads out all pixels of the image sensing device by setting a whole region of the image sensing device as the read object region.

In the image input apparatus according to the second aspect of the present invention, the image sensing device is preferably capable of reading out all pixels within one vertical scanning period.

In the image input apparatus according to the second aspect of the present invention, a driving frequency and horizontal scanning frequency of the image sensing device preferably remain unchanged regardless of the operation mode.

In the image input apparatus according to the second aspect of the present invention, a driving frequency and horizontal scanning frequency of the image sensing device preferably remain unchanged in both the first and second modes, and the image processing means preferably continuously reads out pixels in units of scanning lines from the read object region corresponding to the first mode in the first mode and intermittently reads out pixels in units of scanning lines from the read object region corresponding to the second mode in the second mode.

In the image input apparatus according to the second aspect of the present invention, in the first mode the image processing means preferably discards pixels on unnecessary scanning lines of the image sensing device in a blanking period by rapidly transferring the pixels, thereby reading out pixels only from the read object region corresponding to the first mode.

In the image input apparatus according to the second aspect of the present invention, the image processing means preferably comprises an image buffer for temporarily storing an image read out from the image sensing device and, in the first mode, writes only pixels belonging to a necessary region, among other pixels continuously read out from the read object region of the image sensing device, into the image buffer and cuts out a portion of an image sensed by the image sensing device by processing the pixels written in the image buffer.

In the image input apparatus according to the second aspect of the present invention, the image processing means preferably comprises an image buffer for temporarily storing an image read out from the image sensing device and, in the first mode, writes only pixels belonging to a necessary region, among other pixels continuously read out from the read object region of the image sensing device, into the image buffer and cuts out a portion of an image sensed by the image sensing device by processing the pixels written in the image buffer.

In the image input apparatus according to the second aspect of the present invention, a frequency of write operation of the image buffer is preferably the same as a driving frequency of the image sensing device, and a frequency of read operation of the image buffer is preferably the same as a frequency of output operation of the output means.

In the image input apparatus according to the second aspect of the present invention, the output means preferably comprises separating means for separating the image generated by the image processing means into a baseband component and a high-frequency component, and outputs the baseband component as image information and the high-frequency component as additional information.

In the image input apparatus according to the second aspect of the present invention, the output means preferably further comprises separating means for separating the image generated by the image processing means into a baseband component and a high-frequency component, and the recording means preferably records the baseband component as image information and the high-frequency component as additional information in the recording medium.

The image input apparatus according to the second aspect of the present invention preferably further comprises reading means for reading out an image recorded in the recording medium.

In the image input apparatus according to the second aspect of the present invention, the output means preferably further comprises transfer means for transferring the image read out from the recording medium by the reading means to an external apparatus.

Further objects, features and advantages of the present invention will be apparent from the following detailed description of embodiments of the present invention with reference to the accompanying drawings.

BRIEF DESCRIPTION OF THE DRAWINGS

FIGS. 6A and 6B are timing charts showing CCD driving timings in a low-speed high-resolution mode (second mode);

FIGS. 19A and 19B are schematic views showing processing in a conventional video camera.

DETAILED DESCRIPTION OF THE PREFERRED EMBODIMENTS

Preferred embodiments of the present invention will be described below with reference to the accompanying drawings.

First Embodiment

Figure 1:
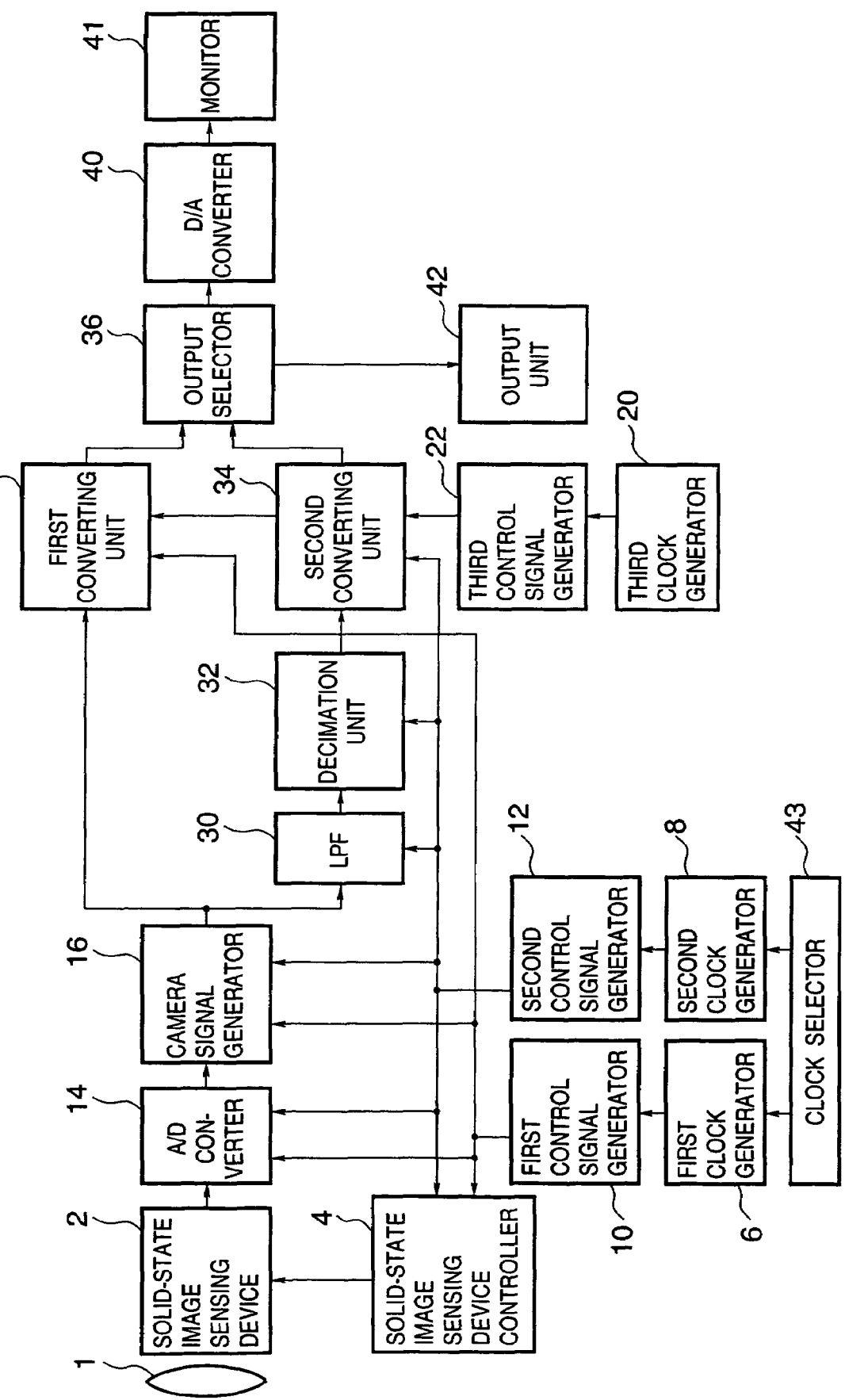
FIG. 1 is a block diagram schematically showing the arrangement of a video camera (image input apparatus) according to the first embodiment of the present invention.

FIG. 1 is a block diagram schematically showing the arrangement of a video camera (image input apparatus) according to the first embodiment of the present invention. This video camera shown in FIG. 1 comprises an image forming optical system 1, a CCD 2, a CCD controller 4, a first clock generator 6, a second clock generator 8, a first control signal generator 10, a second control signal generator 12, an A/D converter 14, a camera signal generator 16, a third clock generator 20, a third control signal generator 22, a first converting unit 24, a low-pass filter 30, a decimation unit 32, a second converting unit 34, an output selector 36, a D/A converter 40, a monitor 41, an output unit 42, and a clock selector 43.

The image forming optical system 1 forms an object image on the light receiving surface of the CCD 2. The CCD 2 is an image sensing device for converting an optical image incident on the light receiving surface into an electrical signal. The CCD controller 4 controls the CCD 2 on the basis of a control signal supplied from the first or second control signal generator 10 or 12. The first clock generator 6 generates a first clock. The second clock generator 8 generates a second clock. The first control signal generator 10 generates various control signals in accordance with the output clock from the first clock generator 6. The second control signal generator 12 generates various control signals in accordance with the output clock from the second clock generator 8. The A/D converter 14 converts the output analog signal from the CCD 2 into a digital signal. The camera signal generator 16 generates a video signal from the output signal from the A/D converter 14. The third clock generator 20 generates a third clock. The third control signal generator 22 generates various control signals in accordance with the third clock output from the third clock generator 20. The first converting unit 24 converts the video signal of a first clock rate output from the camera signal generator 16 into a video signal of a third clock rate. The low-pass filter 30 removes a high-frequency component from the output video signal from the camera signal generator 16. The decimation unit 32 decimates or subsamples the output signal from the low-pass filter at a predetermined ratio. The second converting unit 34 converts the output video signal of a second clock rate from the decimation unit 32 into a video signal of the third clock rate. The output selector 36 selectively outputs the video signal from the first or second converting unit 24 or 34. The D/A converter 40 converts the selectively output video signal from the output selector 36 into an analog video signal. The monitor 41 displays the output analog video signal from the D/A converter 40. The output unit 42 outputs the selectively output video signal from the output selector 36. This output unit 42 includes, e.g., an I/F for connecting various external apparatuses to output video signals to these apparatuses and a recording medium for recording video signals. The clock selector 43 selectively operates the first or second clock generator 6 or 8 in accordance with an instruction from, e.g., an operation unit (not shown).

The first clock generated by the first clock generator 6 is used to read out pixels in a part of a whole light receiving region (all pixels) of the CCD 2. This first clock has a frequency so determined that the time (horizontal scanning period) during which pixels in a predetermined width on one line of the CCD 2 are read out is equal to the horizontal scanning period of a video signal supplied to the monitor 41. More specifically, if the number of pixels in the horizontal direction of the CCD 2 is 948, the first clock generator 6 generates a clock having a frequency of, e.g., 18.0 MHz.

The second clock generated by the second clock generator 8 is used to read out pixels in the whole light receiving region of the CCD 2. This second clock has a frequency so determined that the time (vertical scanning period) during which all pixel signals in the CCD 2 are read out is equal to the vertical scanning period of a video signal supplied to the monitor 41. More specifically, if the numbers of pixels in the horizontal and vertical directions of the CCD 2 are 948 and 648, respectively, the second clock generator 8 generates a clock having a frequency (approximately 22.0 MHz) calculated by, e.g., $$(948+\alpha) \times (648+\alpha)/(2 \times 16.6 \text{ msec})$$

The third clock generated by the third clock generator 20 is used to display a video signal read out from the CCD 2 on the monitor 41. For example, the frequency of this third clock is set at 14.3 or 13.5 MHz.

First, a signal read from a part of the light receiving region of the CCD 2 will be described below. The first control signal generator 10 generates various control signals such as horizontal and vertical sync signals necessary for video signal processing in accordance with the first clock. These horizontal and vertical sync signals are supplied to the CCD controller 4. On the basis of these horizontal and vertical sync signals, the CCD controller 4 generates various driving signals for reading out a signal of a region except for the upper and lower hatched portions shown in FIG. 19B, and outputs these driving signals to the CCD 2.

A signal read out from the CCD 2 in accordance with these various control signals is supplied to the first converting unit 24 via the A/D converter 14 and the camera signal generator 16. The first converting unit 24 writes a video signal read out by the first clock in a memory (not shown). After that, in accordance with the third clock the first converting unit 24 reads out, e.g., a video signal of a region except for the left and right hatched portions shown in FIG. 19B from the memory and outputs the readout signal. Note that the pixel size of this video signal matches the pixel size of the monitor 41.

More specifically, a signal of a portion corresponding to 768 central pixels is extracted from 948 pixels in the horizontal direction read out in accordance with the first clock. This video signal extracted in accordance with the third clock is supplied to the D/A converter 40 via the output selector 36. The D/A converter 40 converts the video signal into an analog video signal and outputs the signal to the monitor 41.

Next, a signal read from the whole light receiving region of the CCD 2 will be described below.

The second clock generated by the second clock generator 8 is input to the second control signal generator 12 in order to generate various control signals for reading out a signal of the whole light receiving region of the CCD 2. The second control signal generator 12 generates horizontal and vertical sync signals and the like.

The output horizontal and vertical sync signals generated by the second control signal generator 12 are supplied to the CCD controller 4. On the basis of these horizontal and vertical sync signals, the CCD controller 4 generates various driving signals for reading out a signal of the whole light receiving region and outputs these driving signals to the CCD 2.

A signal read out from the CCD 2 in accordance with these various control signals is supplied to the low-pass filter 30 via the A/D converter 14 and the camera signal generator 16. The pixel size of the input video signal to this low-pass filter 30 is larger, in both the horizontal and vertical directions, than the pixel size of the monitor 41, so the signal cannot be directly displayed on the monitor 41. Therefore, the numbers of pixels are reduced to 768/948 and 485/648 in the horizontal and vertical directions, respectively, before the signal is supplied to the monitor 41.

For this purpose, the low-pass filter 30 performs low-pass filter processing for the video signal so as not to generate aliasing noise. Additionally, the decimation unit 32 writes the video signal in an internal memory (not shown) of the second converting unit 34 while decimating the video signal. In accordance with the third clock, the second converting unit 34 reads out the decimated video signal from the memory and supplies the readout signal to the D/A converter 40 via the output selector 36. The D/A converter 40 converts this video signal into an analog video signal and supplies the signal to the monitor 41.

In addition to the function of selectively supplying the output video signal from the first or second converting unit 24 or 34 to the D/A converter 40, the output selector 36 has a function of supplying the selected video signal to the output unit 42.

As described above, the video camera of this embodiment has the function of reading out pixels in the whole light receiving region of the CCD 2 and outputting the readout signal to the monitor 41 and the like and the function of reading out pixels in a part of the whole light receiving region of the CCD 2 and outputting the readout signal to the monitor 41 and the like. By selectively using these two functions, the video camera can output a video signal of an image corresponding to a part or the whole of the light receiving region of the CCD 2. With this function, an electrical zoom function, for example, can be realized.

Also, in this embodiment, the CCD 2 is driven in accordance with the clock having the first frequency (18.0 MHz) when pixels in the whole light receiving region of the CCD 2 are to be read out. The CCD 2 is driven in accordance with the clock having the second frequency (about 22.0 MHz) higher than the first frequency when pixels in the whole light receiving region of the CCD 2 are to be read out. That is, the clock frequency is raised as the number of pixels to be read out from the CCD increases. Accordingly, a decline of the frame rate can be prevented when the number of pixels to be read out from the CCD 2 increases. Also, the consumption power can be reduced when the amount of signals to be read out from the CCD 2 is small.

Furthermore, in this embodiment the number of pixels of an output image can be changed in accordance with the specifications of the output unit 42 or of an external apparatus connected via the output unit 42.

The video camera shown in FIG. 1 has a pair of clock generators and a pair of control signal generators. However, this video camera can also have one clock generator capable of changing the frequency of a clock to be generated and one control signal generator connected to this clock generator. Alternatively, the second clock can be generated by segmenting the frequency of a clock generated by the second clock generator 8, instead of using the first clock generator 6. Also, three or more different clock frequencies can be used.

Additionally, a method of reading out signals from the CCD 2 is not limited to the combination of a mode in which a signal is read out from the whole region of the CCD 2 and a mode in which a signal is read out from a part of the whole region. For example, the video camera can have a mode in which a signal is read out from a first region of the CCD 2 and a mode in which a signal is read out from the second region which is smaller or larger than the first region. A signal can also be selectively read out from three or more regions. It is also possible to designate an arbitrary region in the CCD 2 and read out a signal from this designated region. In any of these cases, the clock frequency is preferably raised as the size of a region (pixel size) of the CCD 2 from which a signal is to be read out increases,.

Second Embodiment

Figure 2:
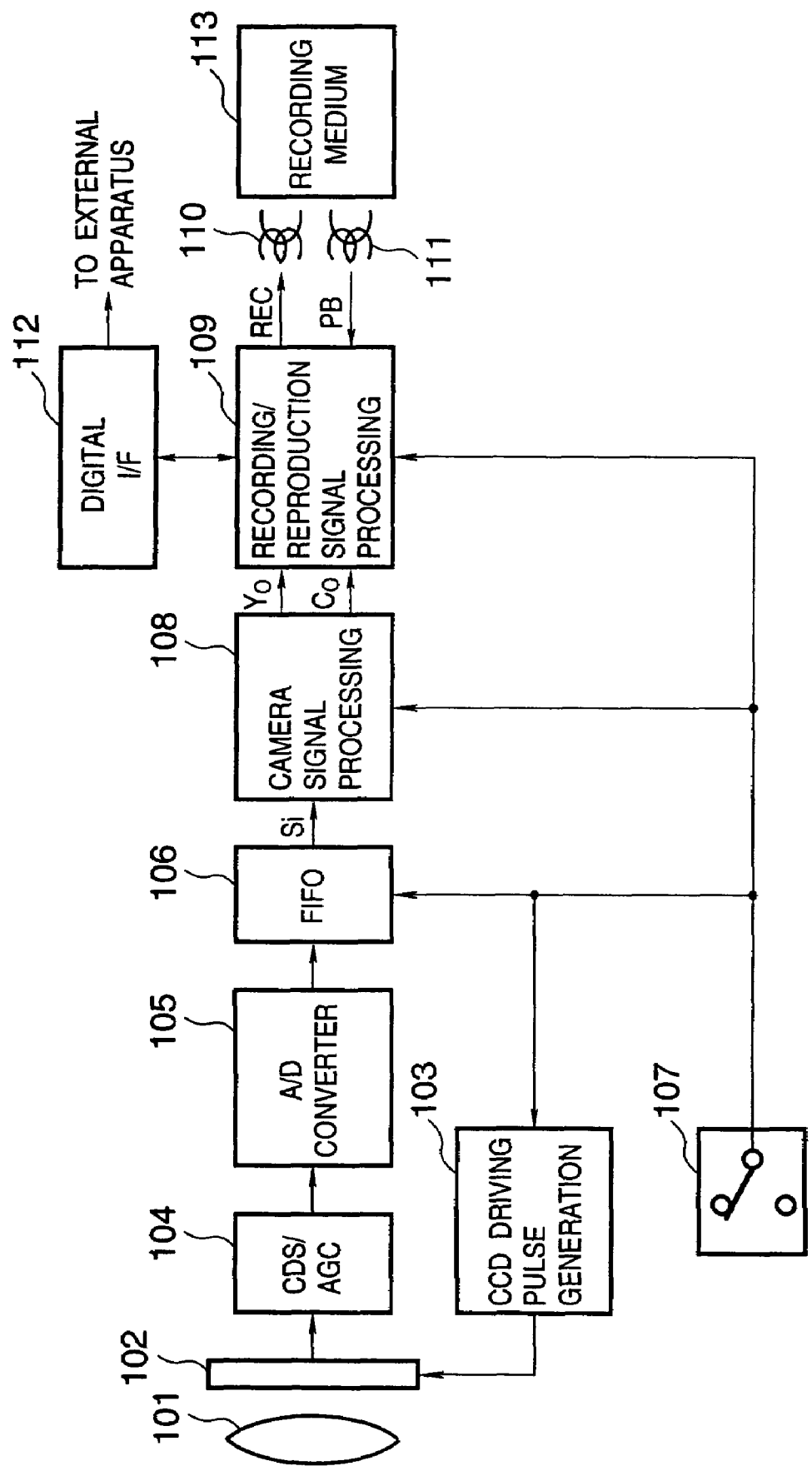
FIG. 2 is a block diagram schematically showing the arrangement of a video camera (image input apparatus) according to the second embodiment of the present invention.

FIG. 2 is a block diagram schematically showing the arrangement of a single-chip video camera (image input apparatus) according to the second embodiment of the present invention. As shown in FIG. 2, this video camera according to the second embodiment of the present invention comprises an image forming optical system 101, a CCD 102., a CCD driving pulse generator 103, a CDS/AGC circuit 104, an A/D converter 105, a FIFO memory 106, a mode switch 107, a camera signal processing circuit 108, a recording/reproduction signal processing circuit 109, a recording head 110, a reproduction head 111, and a digital interface 112.

The image forming optical system 101 forms an object image on the light receiving surface of the CCD 102. This CCD 102 is an image sensing device for converting an optical image incident on the light receiving surface into an electrical signal. The CCD driving pulse generator 103 generates a pulse signal for driving the CCD 102. The CDS/AGC circuit 104 reduces noise contained in an output RGB image signal from the CCD 102 and amplifies the signal to an appropriate level. The A/D converter 105 converts the output RGB image signal from the CDS/AGC unit 104 into a digital signal. The FIFO memory 106 is used as an image buffer.

The mode switch 107 switches the operation modes of the video camera. On the basis of the RGB image signal supplied from the FIFO memory 106, the camera signal processing circuit 108 generates an image signal to be recorded or transferred. The recording/reproduction signal processing circuit 109 processes an image signal to be recorded in a recording medium 113 or an image signal read out from the recording medium 113. The recording heads 110 records image information in the recording medium. The reproduction head 111 reads out image information recorded in the recording medium 113. The digital interface 112 transfers image information read out from the recording medium by the reproduction head 111 or image information supplied from the camera signal processing circuit 108 to an external apparatus.

The operation of the digital camera shown in FIG. 2 will be described below. In the following operation, NTSC as a standard television system is used as a television system. However, this is merely an example and hence does not restrict the range of applications of the present invention.

Figure 3:
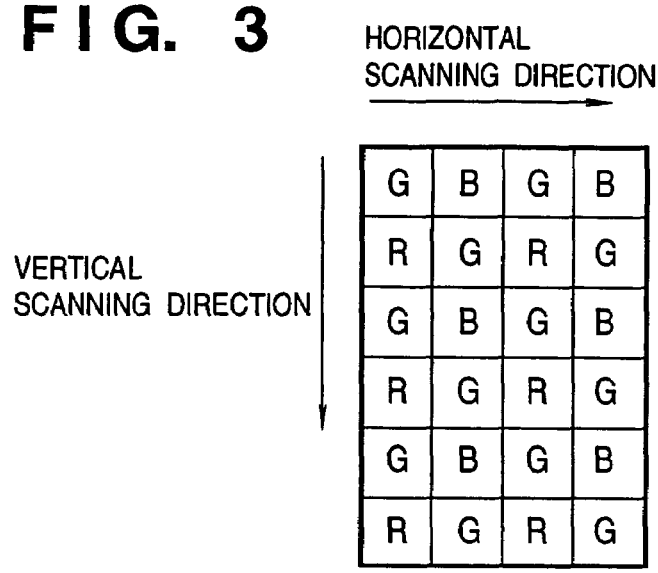
FIG. 3 is a view showing the arrangement of color filters of a CCD.

The CCD 102 converts an object image formed on the light receiving surface of the CCD 2 by the image forming optical system 101 into an electrical signal. On this light receiving surface of the CCD 102, a color filter array for sensing a color image is formed. In this color filter array, for example, as shown in FIG. 3, RGB color filters are periodically arranged.

The CCD 102 has pixels the number of which is larger than the number of pixels in one frame determined by the standard television format. More specifically, in NTSC used in this embodiment, the operating frequency is 13.5 MHz, and an image in one frame is composed of 720 pixels in the horizontal direction and 480 pixels in the vertical direction. The CCD 102 has pixels numbering 1.5 times, in both the horizontal and vertical directions, that of an image in one frame of NTSC. That is, the CCD 102 has 1,080 pixels in the horizontal direction and 720 pixels in the vertical direction.

The CCD 102 used in this embodiment is a CCD (so-called "all-pixel read type" CCD) which reads out information from all scanning lines in one field period, rather than a 2:1 interlace read type CCD generally used in video cameras.

The CCD 102 is driven by the driving pulse supplied from the CCD driving pulse generator 103 and outputs an electrical signal in synchronism with the driving pulse. Also, the CCD 102 is driven at a timing corresponding to the set status of the mode switch 107, i.e., the operation mode. This operation mode includes a normal mode (first mode) and a low-speed high-resolution mode (second mode).

In the normal mode (first mode), the CCD 102 is driven by the same field frequency as in NTSC. However, if all pixels of the CCD 2 are to be read out within one field period, the operating frequency extremely rises, and this increases the consumption power. That is, the operating frequency is 13.5 MHz when 720×480 pixels are read out by the 2:1 interlace system. On the other hand, reading out all pixels within one field period is equivalent to reading out pixels 1.5 times as many, in both the horizontal and vertical directions, as in the 2:1 interlace system within one field period. Therefore, the operating frequency is 13.5 (MHz)×1.5 (horizontal)×1.5 (vertical)×2 (all pixel read)=60.75 MHz This increases the consumption power as described above.

Figure 5:
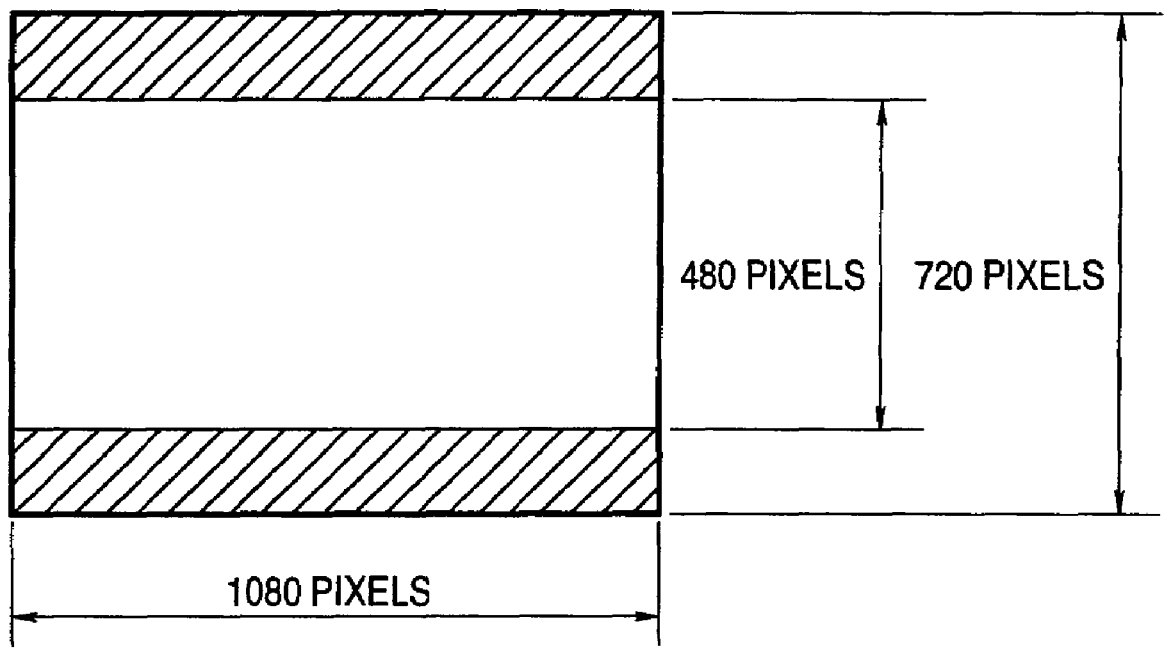
FIG. 5 is a view showing a region in which pixels are read out from the CCD in the normal mode (first mode)

In this embodiment, therefore, as shown in FIG. 5, the CCD 102 is so driven that pixels (CCD signals) constructing the upper and lower portions of the CCD 102 (frame) are rapidly transferred in a vertical blanking period to read out only 480 lines in the central portion of the CCD 102 (frame), thereby preventing a rise in the operating frequency. The operating frequency in this case is 13.5 (MHz)×1.5 (horizontal)×2 (all pixel read)=40.5 MHz The horizontal scanning frequency of the driving signal of the CCD 2 is twice that in NTSC.

Figure 4A:
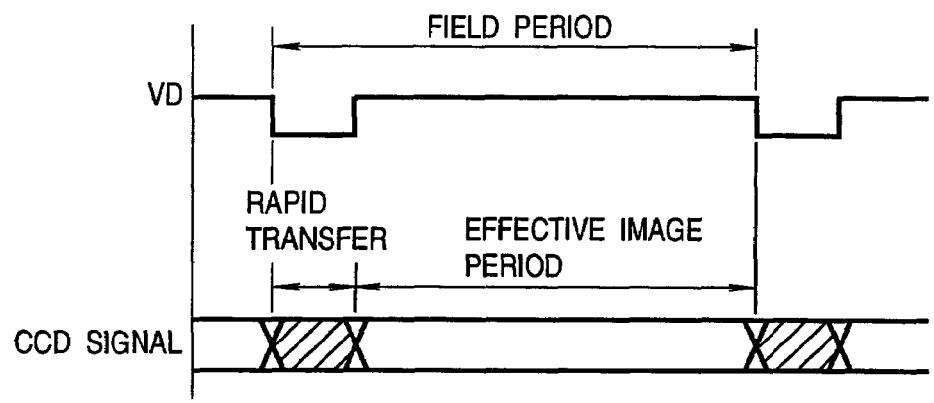
FIGS. 4A and 4B are timing charts showing CCD driving timings in a normal mode (first mode)
Figure 4B:
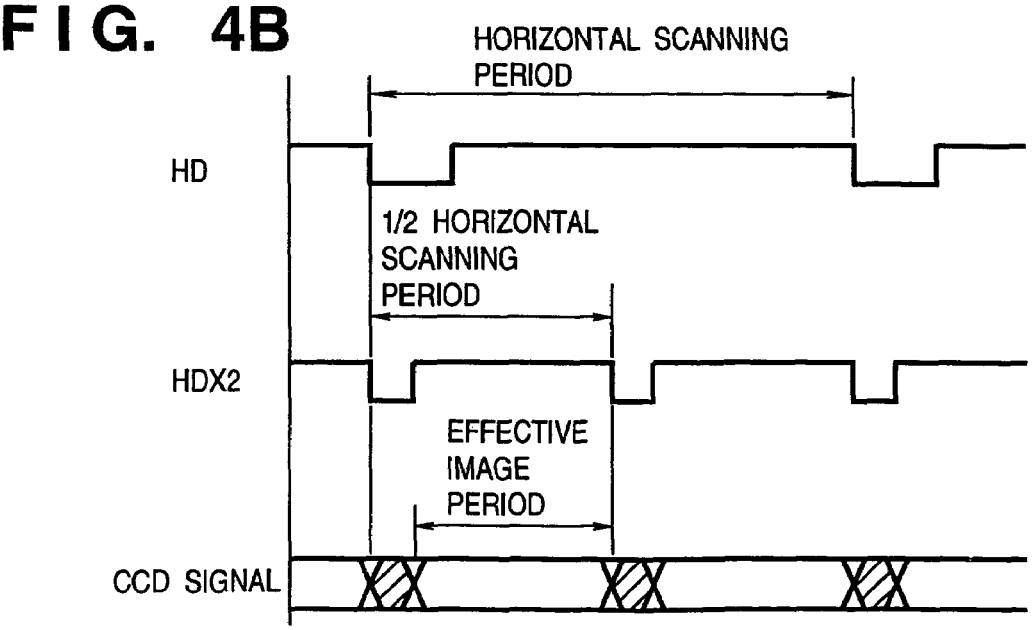

FIG. 4A shows driving timings in the vertical direction of the CCD 102 in the normal mode (first mode). FIG. 4B shows driving timings in the horizontal direction of the CCD 102 in the same mode. Referring to FIGS. 4A and 4B, VD denotes a vertical sync signal; HD, a horizontal sync signal; HDX2, a horizontal sync signal (having a frequency half that of the horizontal sync signal HD) for controlling driving of the CCD 102; and CCD SIGNAL, an electrical signal read out from the CCD 102.

In FIGS. 4A and 4B, the field period is 1/59.94 sec (=16.7 msec), and the horizontal scanning period is 1/(59.94×262.5) sec (=63.6 μsec); both of which match those of the NTSC format.

As shown in FIG. 4A, the CCD 102 is so driven that a total of 240, upper and lower lines of all pixels of the CCD 102 are read out and discarded by rapid transfer in a period called a blanking period which is a part of the field period and during which nothing is displayed on the television screen, and 480 lines of one frame are read out within an effective image period. Also, in this embodiment, pixels of one frame (pixels of two fields) are read out within one field period in the 2:1 interlace standard television system. Accordingly, as shown in FIG. 4B, the horizontal scanning frequency of the horizontal sync signal HDX2 for driving the CCD 102 is twice the horizontal scanning frequency in NTSC (the horizontal scanning period is ½).

In the low-speed high-resolution mode (second mode), on the other hand, an image having pixels the number of which is larger than the number of pixels (image size) of an image recorded in the recording medium 113 in the normal mode (first mode) is recorded in the recording medium 113. The numbers of pixels of an image recorded in the recording medium 113 in this low-speed high-resolution mode are n and m times as large, in the horizontal and vertical directions, respectively, as the numbers of pixels of an image in the normal mode. For example, n and m are preferably natural numbers of 2 or more, or n×m is preferably a natural number of 2 or more. Alternatively, n=m if the ratio of the number of pixels in the horizontal direction to the number of pixels in the vertical direction of an image to be recorded in the recording medium 113 in the normal mode (first mode) is equal to the ratio of the number of pixels in the horizontal direction to the number of pixels in the vertical direction of an image to be recorded in the recording medium 113 in the low-speed high-resolution mode.

In the low-speed high-resolution mode (second mode), the CCD 2 is driven at a field frequency 1/(n×m) times the field frequency in NTSC (equal to the field frequency in the normal mode). This embodiment exemplifies the case of n=m=2.

In the low-speed high-resolution mode (second mode), the CCD 102 is so driven that all pixels of the CCD 102 are read out within a period (n×m) times the field period (1/59.94=16.7 msec) in NTSC. That is, if n=m=2, all pixels of the CCD 102 are read out within a period of 4/59.94 sec (=66.7 msec).

If this is the case, the frequency for driving the CCD 102 can be made lower than the frequency (twice the frequency in the NTSC format) in the normal mode (first mode). However, any difference between the driving frequency of the CCD 102 in the normal mode and the driving frequency of the CCD 2 in the low-speed high-resolution (second mode) is unpreferable for the system configuration. In this embodiment, therefore, the driving frequencies in the two modes are equal.

More specifically, in the low-speed high-resolution mode (second mode) of this embodiment, the same driving frequency as in the normal mode (first mode) is used, and each line is a read unit. The CCD 102 is intermittently driven within each unit, and all pixels of the CCD 102 are read out in four (=n×m) field periods. In other words, in the low-speed high-resolution mode (second mode) of this embodiment, the CCD 102 is intermittently driven in units of lines so as to read out signals of three lines in units of lines within four horizontal scanning periods in NTSC. So, four field periods in NTSC are necessary to read out all pixels of the CCD 102 in the low-speed high-resolution mode (second mode).

In the low-speed high-resolution mode as described above, all pixels of the CCD 2 are read out in a period four (=n×m) times the field period (the same as the field period in the normal mode) in NTSC. This is to record an image composed of pixels the number of which is (n×m) times the number of pixels in the normal mode into the recording medium 113 on the basis of the readout pixels. That is, to record an image by the same format (recording density) in the recording medium 113 in the normal mode and low-speed high-resolution mode, recording is preferably performed in the low-speed high-resolution mode in a period (n×m) times the field period in the normal mode (first mode).

FIG. 6A shows driving timings in the vertical direction of the CCD 102 in the low-speed high-resolution mode. FIG. 6B shows driving timings in the horizontal direction of the CCD 102 in the same mode. Similar to FIGS. 4A and 4B, the field period is 1/59.94 sec (=16.7 msec), and the horizontal period is 1/(59.94×262.5) sec (=63.6 μsec); both of which match those of the NTSC format.

As shown in FIG. 6A, all pixels of the CCD 102 are read out in four (=n×m) field periods in the low-speed high-resolution mode. As shown in FIG. 6B, the horizontal scanning frequency of the horizontal sync signal HDX2 for controlling driving of the CCD 102 is twice that in NTSC as in the normal mode. So, the CCD 102 is intermittently driven in units of scanning lines so as to read out signals of three lines within four horizontal scanning periods.

When pixels are read out in the low-speed high-resolution mode from the CCD 102 in a period (n×m) times the field period in the normal mode, it is also possible to generate an image in which the numbers of pixels (not integral multiples of the numbers of pixels in the normal mode) are (n−1) to n times and (m−1) to m times as large, in the horizontal and vertical directions, respectively, as those in the normal mode, and record this image in the recording medium.

A CCD signal read out from the CCD 102 is input to the A/D converter 105 via the CDS/AGC circuit 104. The A/D converter 105 converts this CCD signal into a digital signal and supplies the signal to the FIFO memory 106.

The FIFO memory 106 operates at different timings in accordance with the operation modes set by the mode switch 107.

In the normal mode (first mode), the FIFO memory 106 so operates as to cut out a portion (central portion) displayed on the television screen from a horizontally long image supplied from the CCD 102. By setting the frequency at which an image signal is read out from the FIFO memory 106 to ⅔ the write frequency (=the frequency for driving the CCD 102), i.e., 27.0 MHz, the frequencies of the horizontal and vertical sync signals can be matched in systems before and after the FIFO memory 106.

Figure 7:
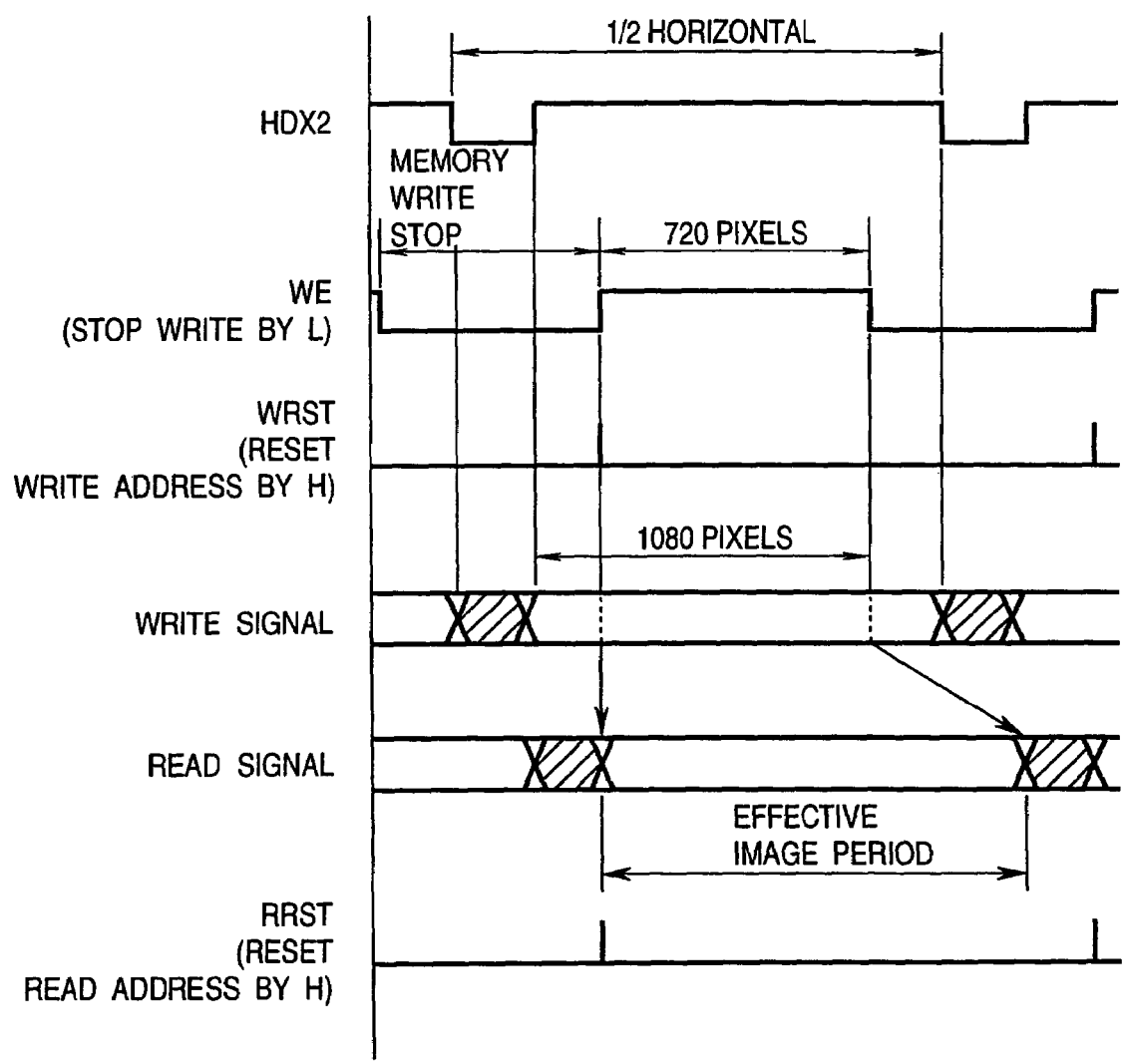
FIG. 7 is a timing chart showing FIFO memory control timings in the normal mode (first mode)

FIG. 7 is a timing chart showing the control timings of the FIFO memory 106 in the normal mode. Referring to FIG. 7, WE denotes a write enable signal; WRST, a reset signal for resetting the write address in the FIFO memory 106; WRITE SIGNAL, a write signal (image signal); READ SIGNAL, a read signal (image signal); and RRST, a reset signal for resetting the read address in the FIFO memory. As shown in FIG. 7, in the normal mode (first mode), only ⅔ pixels in a central portion, i.e., only 720 pixels in a central portion of 1,080 pixels in an effective image region are written in the FIFO memory 106 and read out at a frequency ⅔ the write frequency. Consequently, the central portion of the effective image region can be cut out while the frequencies of the horizontal and vertical sync signals are matched in the systems before and after the FIFO memory 106.

In the low-speed high-resolution mode (second mode), signals are intermittently read out from the CCD 102, and signals of all pixels supplied to the FIFO memory 106 via the CDS/AGC circuit 104 and the A/D converter 105 are written in the FIFO memory 106. The signals written in the FIFO memory 106 are read out from the FIFO memory 106 at the same read frequency of 27.0 MHz as in the normal mode. The horizontal scanning frequency in reading is twice the horizontal scanning frequency of the signal for driving the CCD 102, i.e., the same as the horizontal scanning frequency in NTSC.

Figure 8:
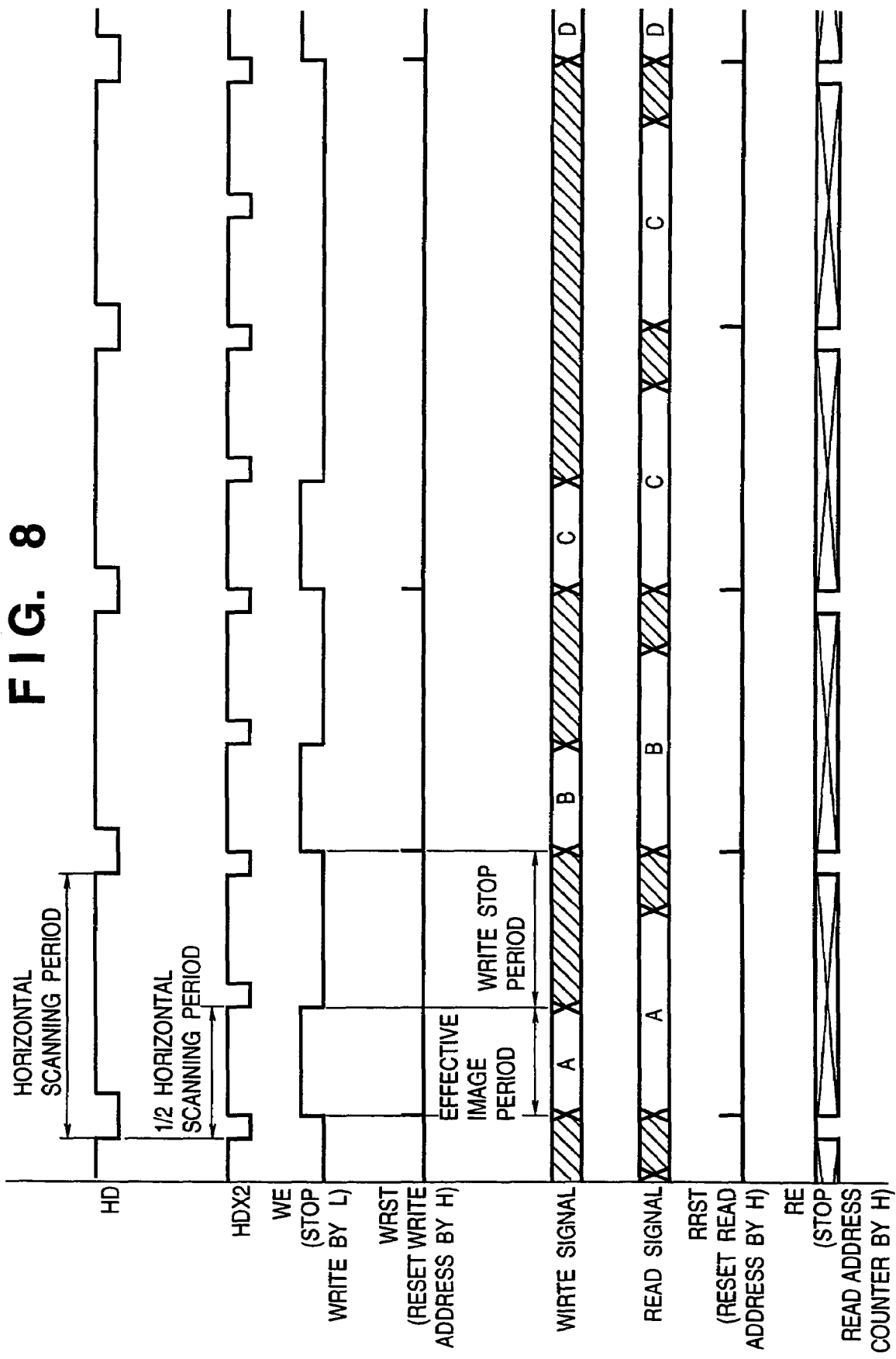
FIG. 8 is a timing chart showing FIFO memory control timings in the low-speed high-resolution mode (second mode)

FIG. 8 is a timing chart showing the control timings of the FIFO memory 106 in the low-speed high-resolution mode. The meanings of individual signals are the same as in FIG. 7. Signals intermittently read out from the CCD 102 and supplied to the FIFO memory 106 via the CDS/AGC circuit 104 and the A/D converter 105 are written in the FIFO memory 106 only in the effective image period in accordance with WE and WRST. This write frequency is naturally the same frequency of 40.5 MHz as the driving frequency of the signal for driving the CCD 102.

A signal of each line written in the FIFO memory 106 is read out at the same frequency of 27.0 MHz as in the normal mode within one horizontal scanning period in NTSC. As shown in FIG. 8, pixels on each line can be continuously read out by resetting the read address in the same period as the horizontal scanning period in NTSC regardless of the write operation.

Figure 9:
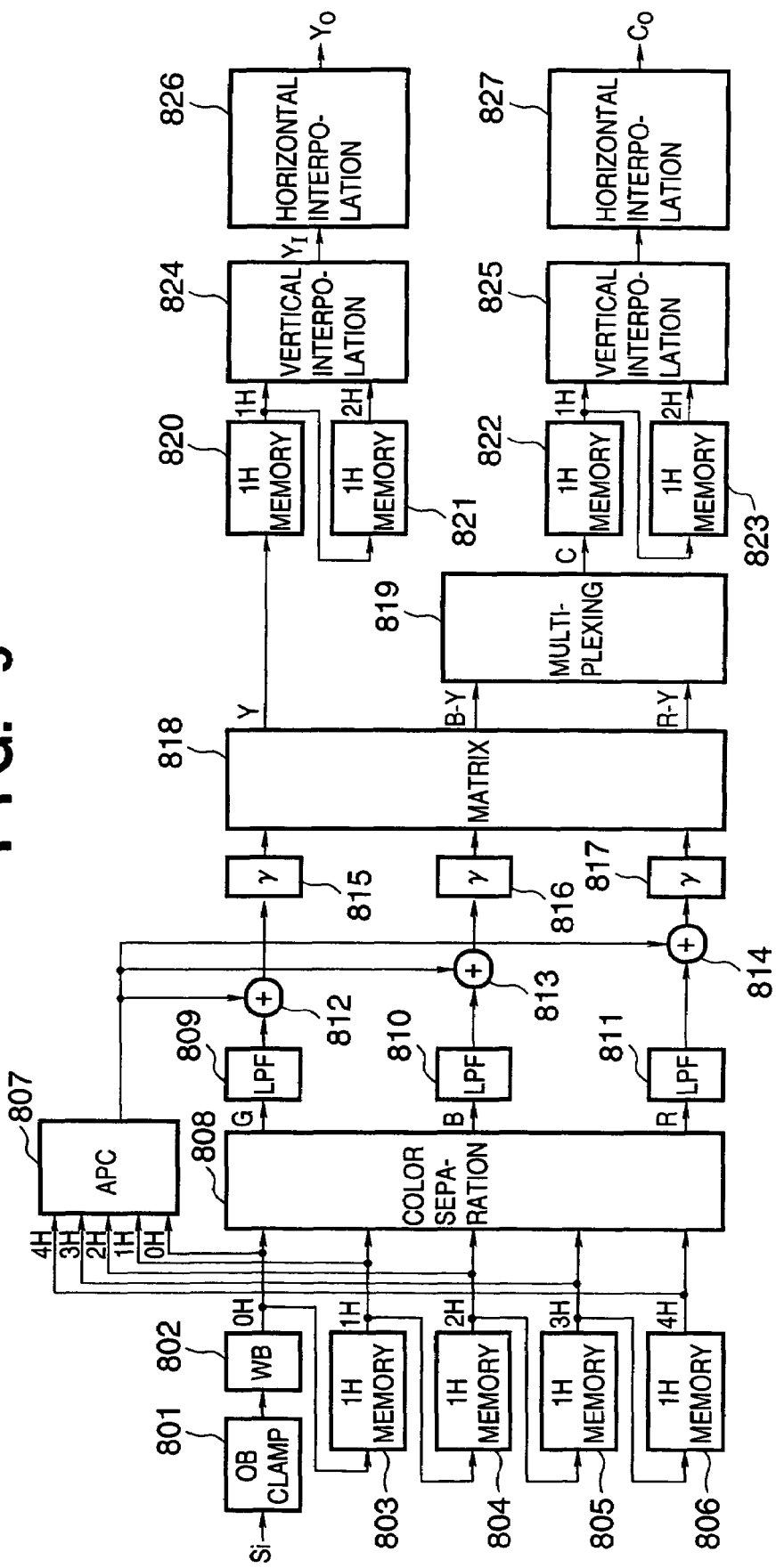
FIG. 9 is a block diagram showing the configuration of a camera signal processing circuit.

A video signal Si read out from the FIFO memory 106 is supplied to the camera signal processing-circuit 108. FIG. 9 is a block diagram showing the configuration of this camera signal processing circuit 108. The signal Si supplied from the FIFO memory 106 is input to a first 1H memory 803 of four cascaded 1H memories 803 to 806 via a white balance circuit 802. Video signals (0H to 4H) of five lines can be obtained from these four 1H memories 803 to 806.

The video signals of five lines output parallel from the white balance circuit 802 and the 1H memories 803 to 806 are supplied to a contour correction signal generating circuit 807 and a color separating circuit 808. The contour correction signal generating circuit 807 extracts a high-frequency component from the video signal to generate a contour correction signal. The color separating circuit 808 separates RGB signals obtained in a point sequential manner in accordance with the arrangement of the color filters in the CCD 102 and interpolates these signals by using the signals of five lines, thereby generating RGB signals G, B, and R. LPFs 809, 810, and 811 remove unwanted frequency components from the RGB signals G, B, and R generated by the color separating circuit 808. Adders 812, 813, and 814 add these processed RGB signals G, B, and R to the output contour correction signal from the contour correction signal generating circuit 807. Consequently, the contour of an image represented by these RGB signals is corrected.

Gamma correcting circuits 815, 816, and 817 perform gamma correction for the output RGB signals from the adders 812, 813, and 814, respectively. After that, a matrix circuit 818 converts the processed RGB signals into a luminance signal Y and color difference signals B-Y and R-Y. A multiplexing circuit 819 multiplexes the two color difference signals B-Y and R-Y generated by the matrix circuit 818 by decimating these signals in units of clocks, thereby converting the signals into a color difference signal C. The multiplexing circuit 818 inputs this color difference signal C to a first 1H memory 822 of two cascaded 1H memories 822 and 823. At the same time, the luminance signal Y is input to a first 1H memory 820 of two cascaded 1H memories 820 and 821.

Each of these 1H memories 820, 821, 822, and 823 synchronizes signals of two lines to perform interpolation in the vertical direction and also performs data holding for interpolation in the horizontal direction. This processing is performed only in the low-speed high-resolution mode. This is so because necessary pixels can be obtained by reading out signals from the CCD 102 in the normal mode. In the normal mode, therefore, the output luminance signal Y from the matrix circuit 818 and the output color difference signal C from the multiplexing circuit 819 are output as a luminance signal Yo and a color difference signal Co, respectively, from the camera signal processing circuit 108.

Figure 10:
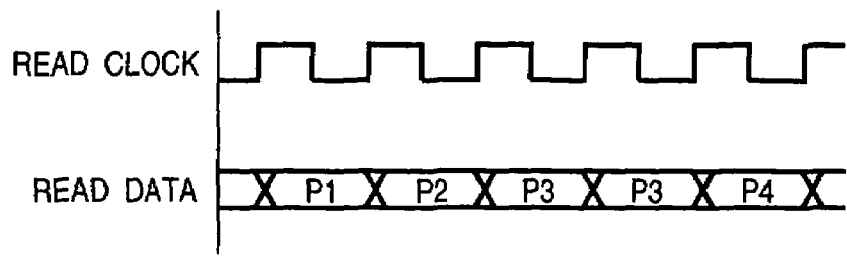
FIG. 10 is a view showing a data holding operation in the horizontal direction.

FIG. 10 is a timing chart showing data holding in the horizontal direction performed by the 1H memories 820, 821, 822, and 823. When the operating frequency is 27.0 MHz for the same horizontal scanning frequency of 15.7 kHz as in the NTSC format as described above, the number of pixels in the horizontal direction is twice 720, i.e., 1,440.

In the low-speed high-resolution mode in this embodiment, however, the number of pixels in the horizontal direction of the CCD 2 is 1,080. So, the effective image period is 1,080 pixels before processing by the 1H memories 820 to 823. Therefore, in each four-clock period, three consecutive pixels are continuously read out and the last one of these three pixels is again read out to apparently continuously read out four pixels in each four-clock period. This is realized by stopping increment of read addresses to be supplied to the 1H memories 820 to 823 once per four clocks.

Luminance signals and color difference signals of two lines synchronized by the 1H memories 820 to 823 are supplied to vertical interpolation circuits 824 and 825. The vertical interpolation circuits 824 and 825 perform vertical linear interpolation for these signals and supplies the interpolated signals to horizontal interpolation circuits 826 and 827. The horizontal interpolation circuits 826 and 827 perform horizontal linear interpolation for the supplied signals, thereby converting the signals into a desired number of pixels (image size). That is, if n=m=2 in the low-speed high-resolution mode, an image having pixels the number of which is twice as large, in both the horizontal and vertical directions, as that in the normal mode, i.e., an image composed of 1,440 pixels (horizontal)× 960 pixels (vertical) is generated.

Figure 11:
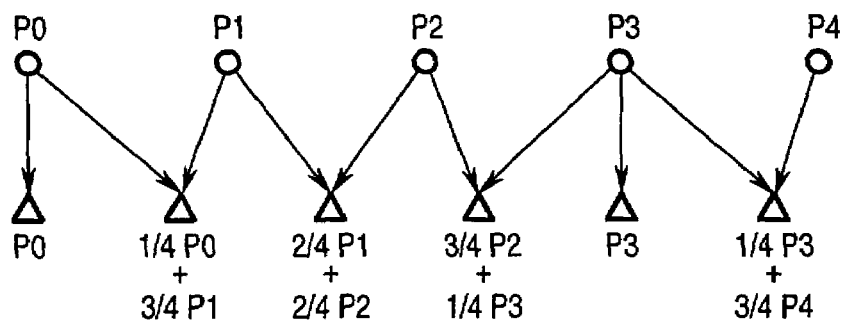
FIG. 11 is a view showing the geometrical positional relationship between pixels (○) before interpolation by a horizontal interpolation circuit and pixels (Δ) after the interpolation and coefficients in linear interpolation.
Figure 12:
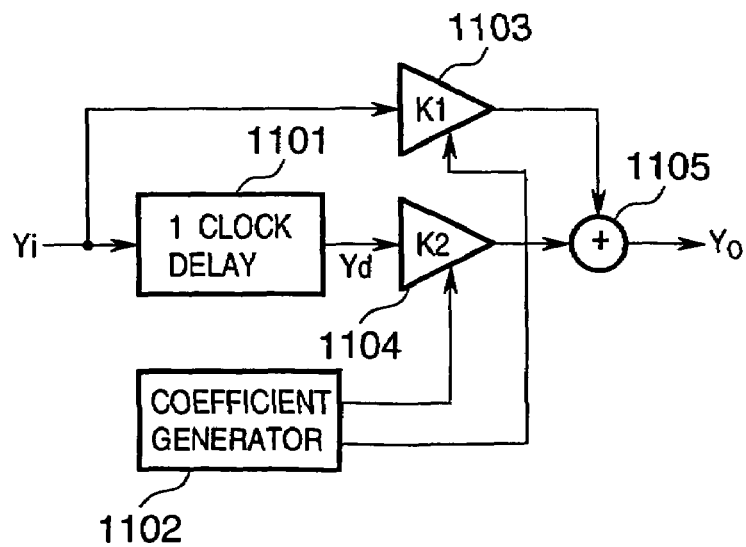
FIG. 12 is a block diagram showing the configuration of the horizontal interpolation circuit.
Figure 13:
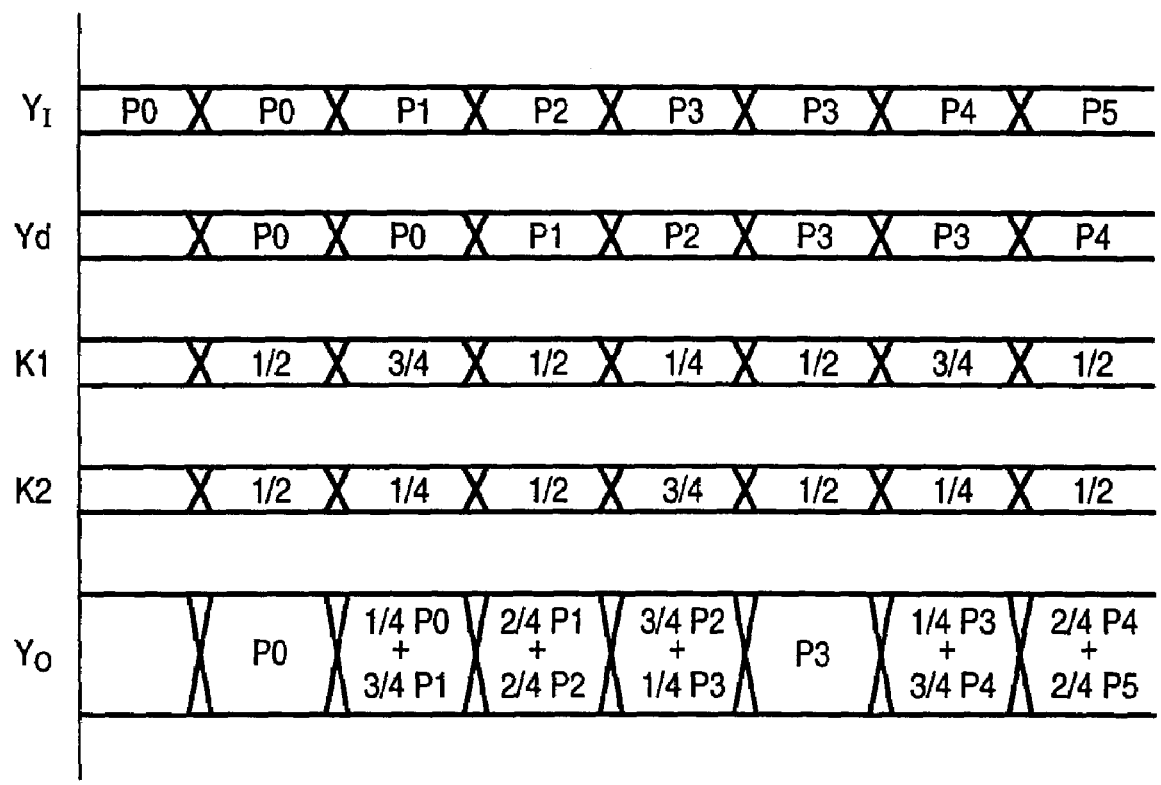
FIG. 13 is a timing chart showing signal timings in the horizontal interpolation circuit.

FIG. 12 is a block diagram showing the configuration of the horizontal interpolation circuit 826. FIG. 11 shows the geometrical positional relationship between pixels (○) before interpolation by the horizontal interpolation circuit 826 and pixels (Δ) after the interpolation and coefficients in linear interpolation. FIG. 13 is a timing chart showing the timings of individual signals in the horizontal interpolation circuit 826.

An input luminance signal Yi to the horizontal interpolation circuit 826 is supplied to a first coefficient unit 1103. This luminance signal Yi is also delayed by one clock by a one-clock delay unit 1101 and supplied as a delay signal Yd to a second coefficient unit 1104.

A coefficient generator 1102 generates first and second coefficients K1 and K2 in accordance with the geometrical positions of pixels generated by interpolation and supplies these first and second coefficients K1 and K2 to the first and second coefficient units 1103 and 1104, respectively. The first and second coefficient units 1103 and 1104 respectively multiply the luminance signal Yi and the delay signal Yd by their coefficients. An adder 1105 adds the two products and outputs the sum as an interpolation signal Yo.

The color difference signal is also horizontally interpolated in the same manner as above. Although only horizontal interpolation is explained in this embodiment, vertical interpolation can also be executed by applying an identical method.

The luminance signal Yo and the color difference signal Co generated by the camera signal processing circuit 108 are supplied to the recording/reproduction signal processing circuit 109 where these signals are subjected to recording processes, e.g., compressing encoding, addition of error correction codes, and modulation. The recording head 110 records the processed signals in the recording medium 113. The recording/reproduction signal processing circuit 109 records and reproduces signals by formats corresponding to, e.g., the consumer digital video standard. Also, an input image to the recording/reproduction signal processing circuit 109 is a 60-field/sec signal composed of 720 pixels (horizontal)×480 pixels (vertical).

In the normal mode, therefore, the recording/reproduction signal processing circuit 109 generates a standard television signal from a 60-frame/sec signal, generated by the camera signal processing circuit 108 and composed of 720 pixels (horizontal)×480 pixels (vertical), by decimation implementing 2:1 interlace scanning, and records this standard television signal in the recording medium 113. In the low-speed high-resolution mode, as shown in FIGS. 14A and 14B, the recording/reproduction signal processing circuit 109 segments a 15-frame/sec image composed of 1,440 pixels (horizontal)×960 pixels (vertical) into four frame images A, B, C, and D each having 720 pixels (horizontal)×480 pixels (vertical), and records them as eight field images Aodd, Aeven, Bodd, Beven, Codd, Ceven, Dodd, and Deven.

Figure 14A:
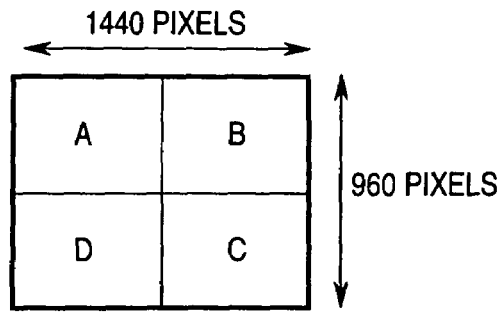
FIGS. 14A to 14C are views showing a method of recording (segmenting) an image generated in the low-speed high-resolution mode (second mode)
Figure 14B:
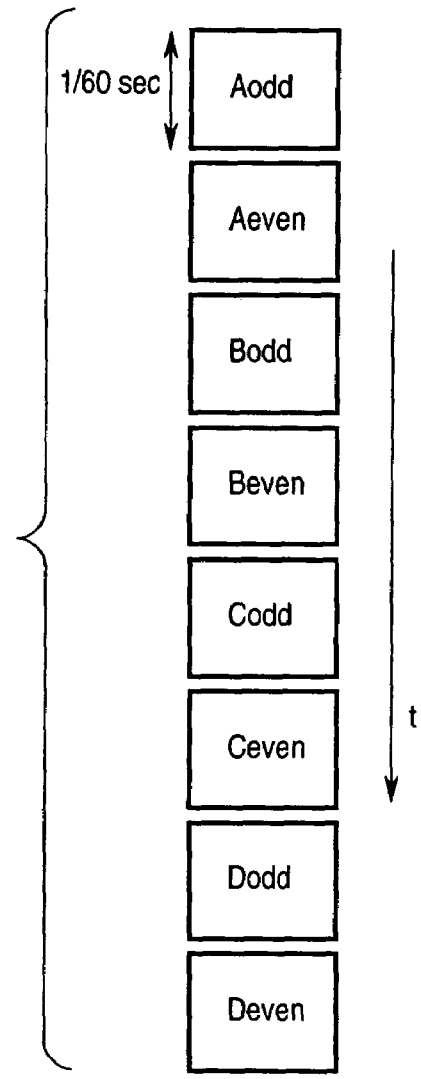
Figure 14C:
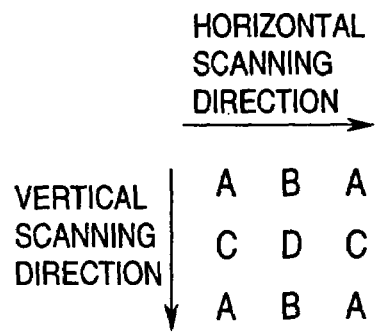

A method shown in FIG. 14C can also be used instead of the method shown in FIGS. 14A and 14B. Referring to FIG. 14C, an image having 1,440 pixels (horizontal)×960 pixels (vertical) is segmented into four frame images by subsampling in units of two pixels in both the horizontal and vertical directions, and these four frame images are recorded in the recording medium 113.

As described above, by using the normal mode (first mode) and the low-speed high-resolution mode (second mode) as the operation modes, an apparatus which uses images can be provided with high-resolution images meeting the specifications of the apparatus.

Also, in the low-speed high-resolution mode (second mode) in which an image having pixels the number of which is n (horizontal)×m (vertical) times the number of pixels in the normal mode (first-mode) is recorded, signals are read out from an image sensing device in an (n×m)-fold vertical scanning period, and the number of pixels is converted (magnified). Consequently, a high-resolution image can be recorded without changing the horizontal scanning frequency and driving frequency of the image sensing device in the normal mode.

Furthermore, this embodiment uses an image sensing device having pixels the number of which is larger than the number of pixels defined by a predetermined recording format and includes first and second modes. In the first mode, an image of a size equal to an image size defined by the recording format is cut out from all-pixel information of the image sensing device and recorded in a recording medium. In the second mode, the all-pixel information of the image sensing device is read out in a period (n×m) times the vertical scanning period in the normal mode. The readout information is converted into an image in which the numbers of pixels are n and m times as large, in the horizontal and vertical directions, respectively, as those defined by the recording format. This converted image is recorded in the recording medium. Consequently, it is possible to switch, e.g., recording of motion images of normal image quality (resolution) and recording of high-definition (high-resolution) semi-motion images (or still images) in accordance with the purpose.

Third Embodiment

Figure 15:
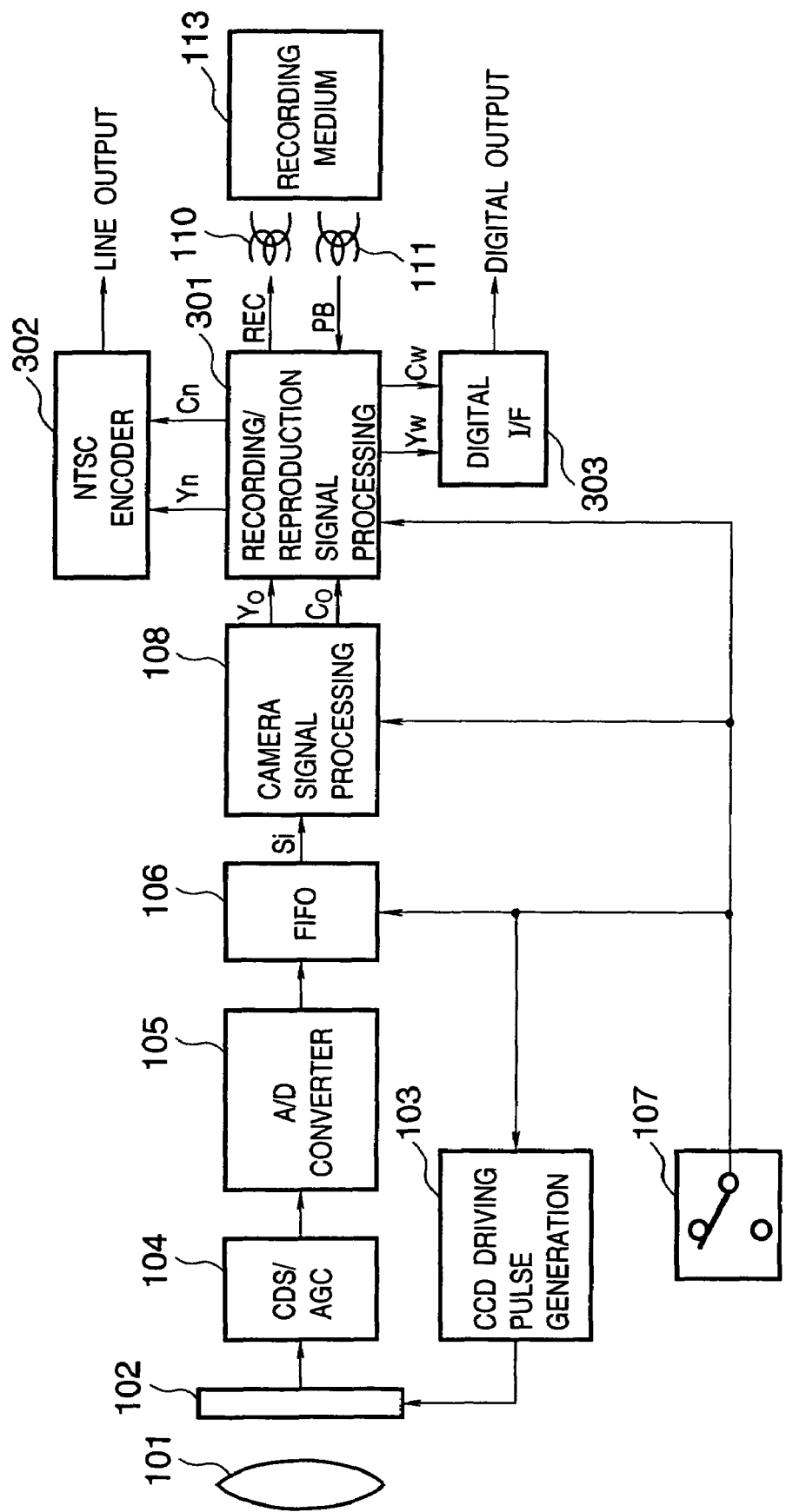
FIG. 15 is a block diagram schematically showing the arrangement of a video camera according to the third embodiment of the present invention.

FIG. 15 is a block diagram schematically showing the arrangement of a single-chip video camera according to the third embodiment of the present invention. The single-chip video camera of this embodiment comprises an image forming optical system 101, a CCD 102, a CCD driving pulse generator 103, a CDS/AGC circuit 104, an A/D converter 105, a FIFO memory 106, a mode switch 107, and a camera signal processing circuit 108. All of these components are identical with those in the second embodiment. Differences from the second embodiment will be described below.

Figure 16:
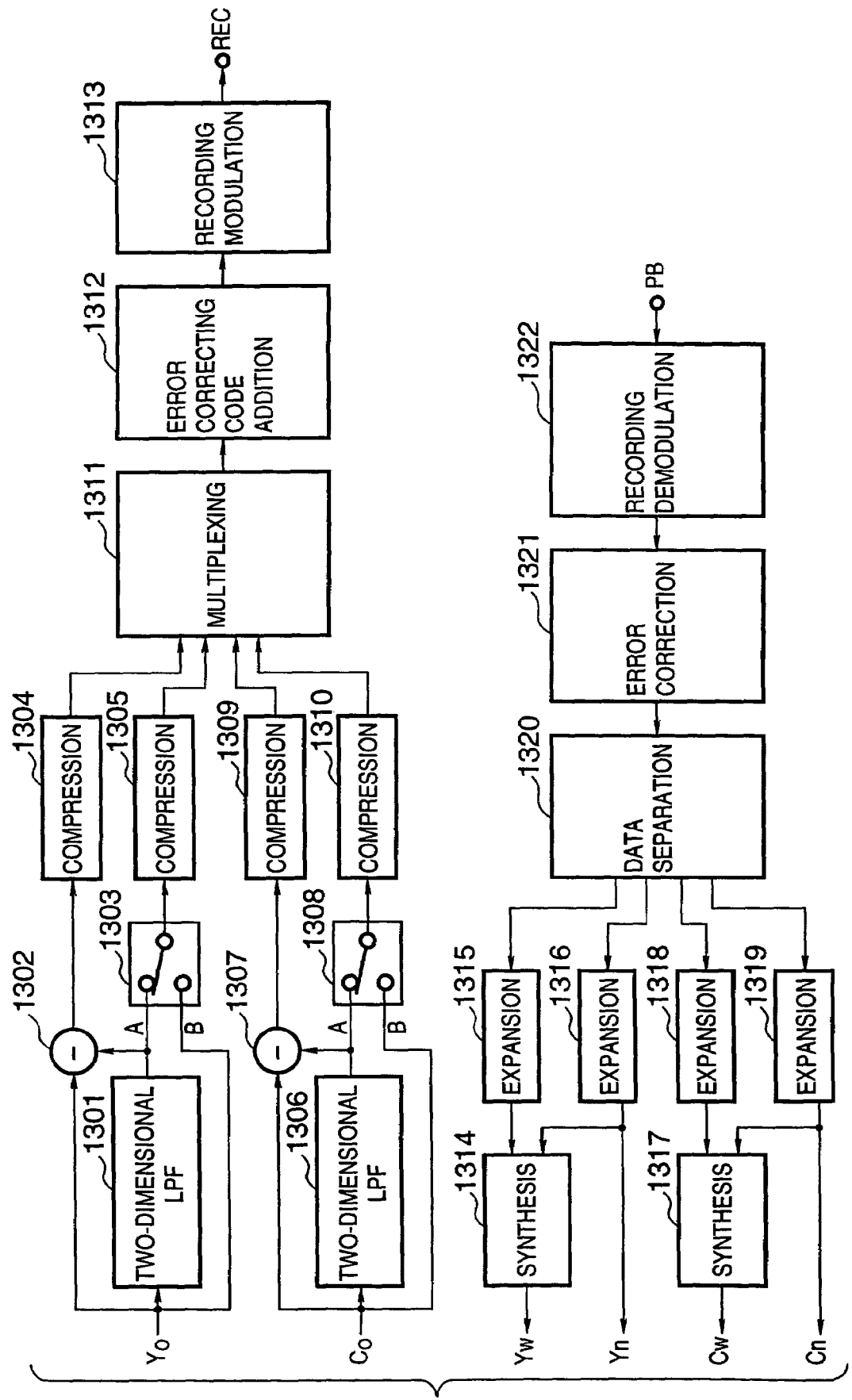
FIG. 16 is a block diagram showing the configuration of a recording/reproduction signal processing circuit.

FIG. 16 is a block diagram showing the configuration of a recording/reproduction signal processing circuit 301. In a normal mode (first mode), selectors 1303 and 1308 select inputs to terminals B and supply a luminance signal Yo and a color difference signal Co supplied from the camera signal processing circuit 108 to compression encoding circuits 1305 and 1310, respectively.

The compression encoding circuits 1305 and 1310 supply the compression-encoded luminance signal and color difference signal to a multiplexing circuit 1311 where the signals are formatted in accordance with a recording format. An error correction code addition circuit 1312 adds parities for correcting transmission line errors to the signals. A recording modulation circuit 1313 supplies the signals to a recording head 110.

In a low-speed high-resolution mode (second mode), on the other hand, band-limiting circuits (two-dimensional low-pass filters) 1301 and 1306 extract baseband components having the same size as in the normal mode (first mode) from the luminance signal Yo and the color difference signal Co supplied from the camera signal processing circuit 108. Subtracters 1302 and 1307 calculate the differences between the luminance signal Yo and the color difference signal Co and the output baseband components from the band-limiting circuits 1301 and 1306, thereby extracting high-frequency components of the luminance signal Yo and the color difference signal Co.

In the low-speed high-frequency mode (second mode), the selectors 1303 and 1308 select terminals A to supply the baseband components extracted by the band-limiting circuits 1301 and 1306 to the compression encoding circuits 1305 and 1310, respectively. The compression encoding circuits. 1305 and 1310 compression-encode these signals as in the normal mode (first mode). Meanwhile, the high-frequency components extracted by the subtracters 1302 and 1307 are supplied to second compression encoding circuits 1304 and 1309 where these components are compression-encoded. The multiplexing circuit 1311 formats the compression-encoded baseband components and high-frequency components of the luminance and color difference signals.

Figure 17:
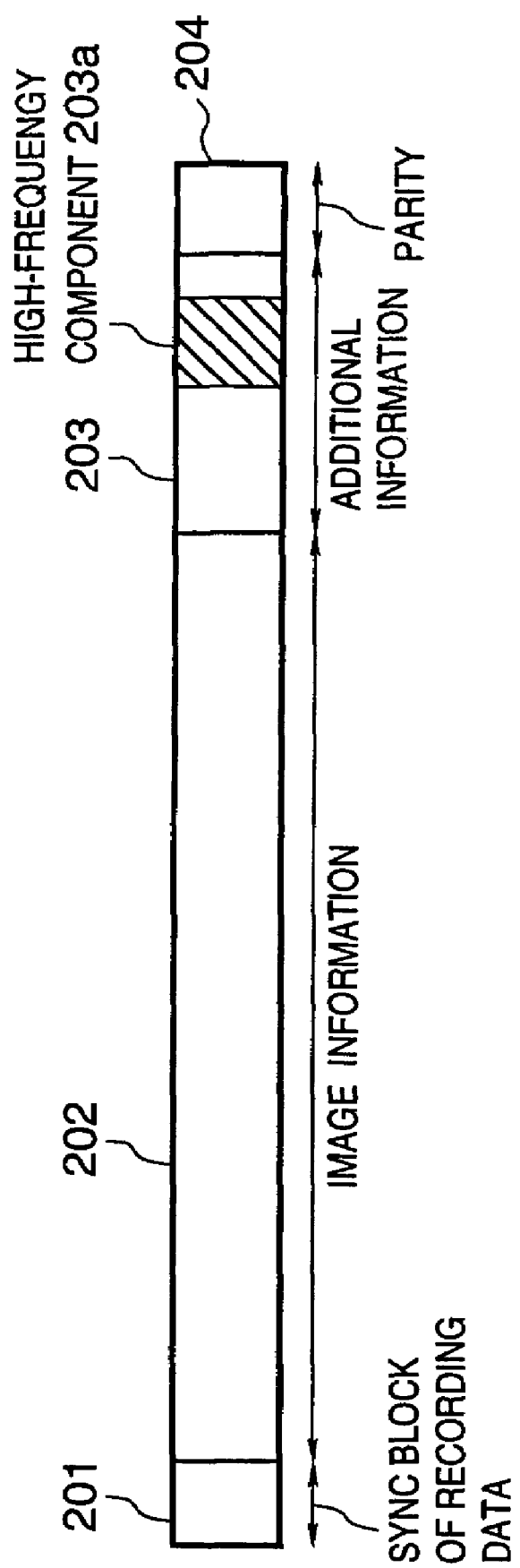
FIG. 17 is a view showing the block structure of recording data which the recording/reproduction signal processing circuit records in a recording medium.
Figure 18:
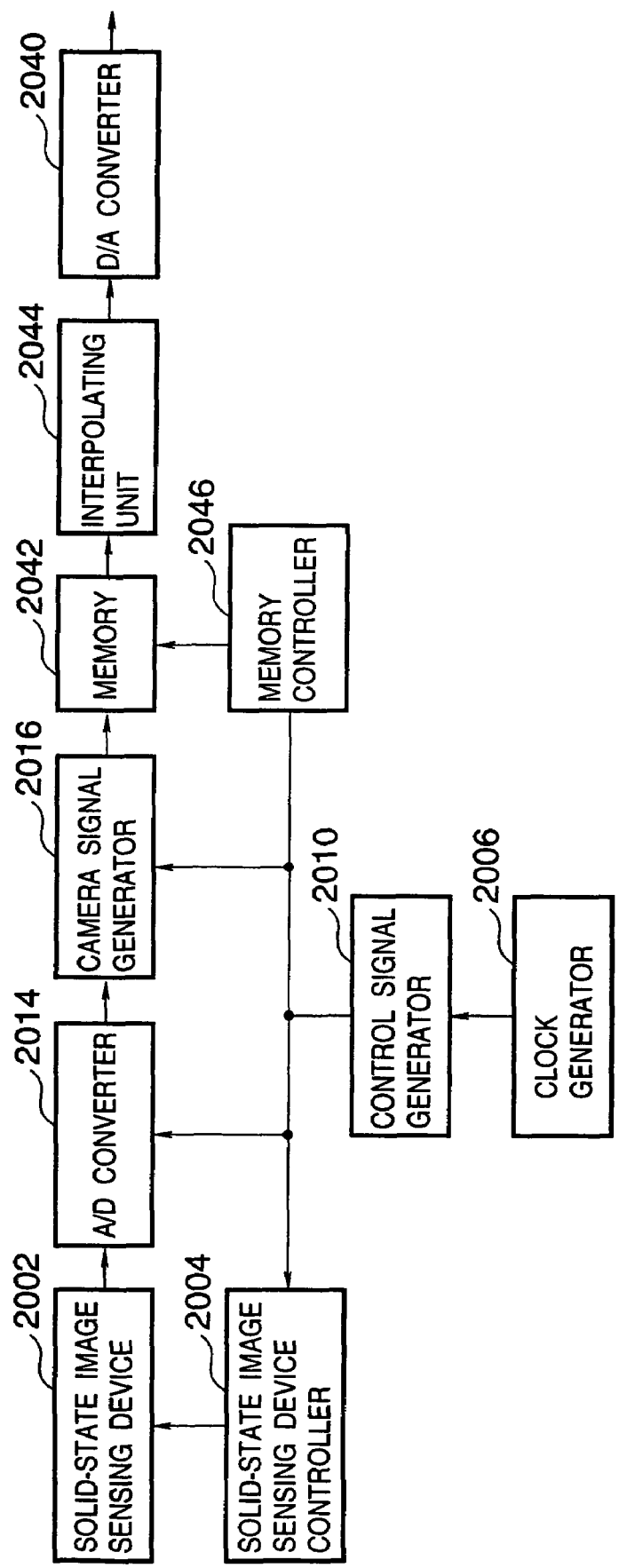
FIG. 18 is a block diagram showing the arrangement of a conventional digital video camera with camera shake compensating function.
Figure 20:
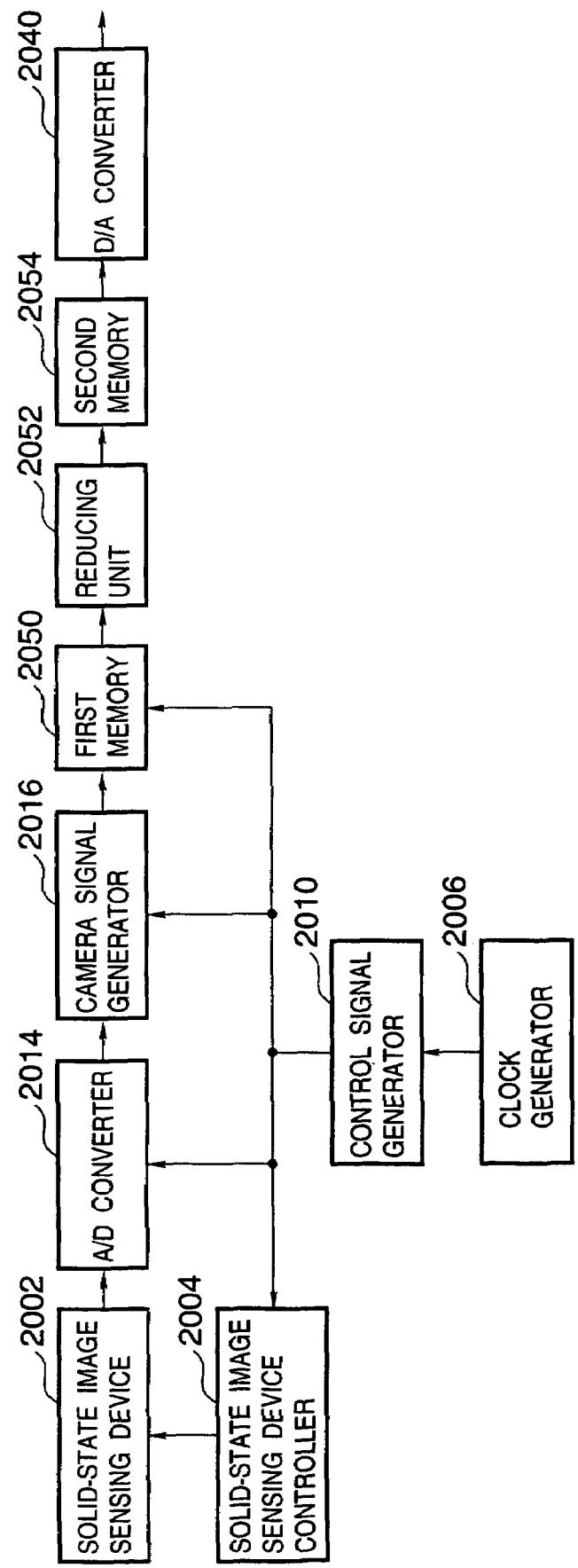
FIG. 20 is a block diagram showing the arrangement of a conventional digital camera.

FIG. 17 is a view showing the block structure of recording data which the recording/reproduction signal processing circuit 301 records in a recording medium 113. As shown in FIG. 17, one block of recording data is constructed of a sync character region 201, an image information region 202, an additional information region 203, and a parity region 204. In the image information region 202, image information in the normal mode or a baseband component in the low-speed high-resolution mode is recorded. Also, a high-frequency component region 203a for recording a high-frequency component is formed in the additional information region 203 in the low-speed high-resolution mode.

The multiplexing circuit 1311 formats recording data into this block structure including the sync character region 201, the image information region 202, and the additional information region 203. The error correction code addition circuit 1312 adds parities for correcting transmission line errors to the parity region 204. The recording modulation circuit 1313 supplies the recording data to the recording head 110.

In reproduction, a reproduction head 111 reads out a reproduction signal from the recording medium 113 and supplies the signal to a data separating circuit 1320 via a recording demodulation circuit 1322 and an error correction circuit 1321. The data separating circuit 1320 extracts compression-encoded baseband components (or image information in the normal mode) and high-frequency components (only in the low-speed high-resolution mode) of luminance and color difference signals from the reproduction signal having the block structure shown in FIG. 17. The data separating circuit 1320 supplies the high-frequency component of the luminance signal to an expanding circuit 1315, the baseband component of the luminance signal to an expanding circuit 1316, the high-frequency component of the color difference signal to an expanding circuit 1318, and the baseband component of the color difference signal to an expanding circuit 1319.

An NTSC encoder 302 converts baseband components Yn and Cn of the luminance and color difference signals expanded by the expanding circuits 1316 and 1317 into a standard television signal and outputs the signal as line output.

For an image recorded in the low-speed high-resolution mode (second mode), synthesizing circuits 1314 and 1317 synthesize the expanded baseband components and high-frequency components to reconstruct a high-resolution image having pixels the number of which is four (=n×m) times that in the normal mode. A digital I/F circuit 303 transfers a luminance signal Yw and a color difference signal Cn of the reconstructed high-resolution image to a connected external digital apparatus (e.g., a personal computer or printer).

In this embodiment, image sensing, recording, and reproduction can be performed in two modes different in resolution and frame rate (the number of frames per sec) in accordance with the format of a digital video. Hence, desired image quality can be obtained in accordance with the purpose.

In the above embodiment, the luminance signal Yw and the color difference signal Cn are transferred to an external apparatus via the digital I/F circuit 303. Instead, the error-corrected data from the error correction circuit 1321 or the like can be transferred to an external apparatus via the digital I/F circuit 303.

Furthermore, a high-definition image is separated into a baseband component and a high-frequency component that are compatible with the recording format of a normal image. The baseband component is recorded as image information, and the high-frequency component is recorded as additional information in a recording medium. Then, an image meeting the specifications of a connected external apparatus can be reproduced and output. Also, a high-definition image can be reproduced by supplying the recording medium to a reproduction apparatus for reproducing high-definition images.

The present invention can be applied to a system constituted by a plurality of devices (e.g., an image sensing device, computer, interface device, and printer) or to an apparatus (e.g., a digital video camera) comprising a single device.

Further, the object of the present invention can also be achieved by providing a storage medium storing program codes of software for performing the aforesaid functions according to the embodiments to a system or an apparatus, reading out the program codes with a computer (e.g., a CPU or MPU) of the system or apparatus from the storage medium, and then executing the program.

In this case, the program codes read out from the storage medium realize the functions according to the embodiments, and the storage medium storing the program codes constitutes the invention.

As the storage medium for supplying the program codes, it is possible to use, e.g., a floppy disk, hard disk, optical disk, magnetooptical disk, CD-ROM, CD-R, magnetic tape, non-volatile memory card, and ROM.

Furthermore, besides aforesaid functions according to the above embodiments are realized by executing the program codes which are read out by a computer, the present invention includes a case where an OS (Operating System) or the like running on the computer performs a part or the whole of actual processing in accordance with instructions of the program codes and realizes functions according to the above embodiments.

Furthermore, the present invention also includes a case where, after the program codes read out from the storage medium are written in a function extension board which is inserted into the computer or in a memory provided in a function extension unit which is connected to the computer, a CPU or the like contained in the function extension board or unit performs a part or the whole of actual processing in accordance with instructions of the program codes and realizes functions of the above embodiments.

The present invention is not limited to the above embodiments and various changes and modifications can be made within the spirit and scope of the present invention. Therefore, to apprise the public of the scope of the present invention the following claims are made.

What is claimed is:

1. An image input apparatus, comprising:
an image sensing device having pixels arranged in two dimensions;
a selector arranged to select a motion image mode of recording a motion image or a still image mode of recording a still image;
a driving circuit arranged to drive the image sensing device such that signals of first pixels included in a first region of the image sensing device are read out in the motion image mode and signals of second pixels included in a second region of the image sensing device are read out in the still image mode, wherein the second region is larger than the first region and number of the second pixels is larger than number of the first pixels;
a signal processing circuit arranged to process signals read out from the image sensing device; and
a recording unit arranged to record signals processed by the signal processing circuit in a recording medium with a predetermined format in the motion image mode,
wherein number of pixels of the image sensing device is larger than number of pixels which is defined by the predetermined format, and
the driving circuit is further arranged to drive the image sensing device such that, in the motion image mode, the signals of the first pixels are read out from the first region in a first vertical scanning period and, in the still image mode, the signals of the second pixels are read out from the second region in a second vertical scanning period that is longer than the first vertical scanning period.

2. The apparatus according to claim 1, wherein the predetermined format is a recording format corresponding to NTSC standard television format.

3. The apparatus according to claim 1, wherein the driving circuit is further arranged to drive the image sensing device such that the signals of the first pixels are read out from the image sensing device by decimating signals of pixels of plural lines in the image sensing device,
the signal processing circuit is further arranged to decimate signals of both sides of each of plural lines in the first region, and
the recording unit is further arranged to record the signals subjected to decimation by the signal processing circuit.

4. The apparatus according to claim 1, wherein the driving circuit is further arranged to drive the image sensing device such that the signals of the first pixels are read out from the image sensing device in non-interlace manner in the motion image mode, and the signals of the second pixels are read out from the image sensing device in non-interlace manner in the still image mode,
the signal processing circuit is further arranged, in the motion image mode, to store the signals of the first pixels read out in non-interlace manner into a memory and to read out the signals stored in the memory such that interlaced signals are generated, and
the recording unit is further arranged to record the interlaced signals in the recording medium.

* * * * *